US012283391B1

(12) United States Patent
Jordan

(10) Patent No.: US 12,283,391 B1
(45) Date of Patent: Apr. 22, 2025

(54) GROUND CONDUCTOR WITH STEEL CORE, COPPER SHEATH, AND WIDTH TO THICKNESS RATIO OF AT LEAST 11:1

(71) Applicant: Exeter Chancery LLC, Nashville, TN (US)

(72) Inventor: Jeffrey T. Jordan, Franklin, TN (US)

(73) Assignee: Exeter Chancery LLC, Nashville, TN (US)

( * ) Notice: Subject to any disclaimer, the term of this patent is extended or adjusted under 35 U.S.C. 154(b) by 0 days.

(21) Appl. No.: 18/927,579

(22) Filed: Oct. 25, 2024

Related U.S. Application Data

(60) Provisional application No. 63/603,590, filed on Nov. 28, 2023.

(51) Int. Cl.
*H01B 1/02* (2006.01)
*H01B 7/22* (2006.01)

(52) U.S. Cl.
CPC ............. *H01B 1/026* (2013.01); *H01B 7/225* (2013.01)

(58) Field of Classification Search
CPC ................................ H01B 1/026; H01B 7/225
USPC .............................................................. 174/6
See application file for complete search history.

(56) References Cited

U.S. PATENT DOCUMENTS 3,282,660 A * 11/1966 Pendleton ............ B23K 20/227 428/676
3,716,649 A * 2/1973 Smith ...................... H01R 4/66 174/94 R
4,577,053 A * 3/1986 Kies ........................ E02D 5/523 29/523
6,653,570 B1 11/2003 Elrod
2007/0019359 A1 1/2007 Elliott
2010/0195256 A1 8/2010 Birnbach
2010/0200266 A1 8/2010 McEllen et al.
2010/0258309 A1 10/2010 Ayodele et al.
2010/0276141 A1 11/2010 Stegemeier et al.
2014/0299348 A1 10/2014 Daumand
2017/0316846 A1 11/2017 Efraimsson et al.
2019/0098745 A1 3/2019 Coakley et al.
2020/0294685 A1* 9/2020 Bayes .................. H01R 13/621
2021/0233677 A1 7/2021 Jordan

OTHER PUBLICATIONS

International Search Report and Written Opinion for International Application No. PCT/US2024/056087, mailed Dec. 30, 2024, 16 pages.

Southwell, C.R., et al., Corrosion of Metals in Tropical Environments—Final Report of 16-Year Exposures, Materials Performance, Voume Fifteen, Jul. 1976, No. Seven, pp. 9, 16 and17, Navel Research Laboratory, Washington, D.C.

(Continued)

*Primary Examiner* — Timothy J Thompson
*Assistant Examiner* — Michael F McAllister
(74) *Attorney, Agent, or Firm* — BLANK ROME LLP

(57) ABSTRACT

Ground conductors are disclosed. The ground conductors can include a core made primarily of a first material, such as steel. The ground conductor can include a surrounding sheath, which includes at least one layer made primarily of a second material, such as copper. The ground conductor has a ratio between its width and its thickness of no less than 11.1:1.

30 Claims, 7 Drawing Sheets

(56) References Cited

OTHER PUBLICATIONS

Romanoff, Melvin, Underground Corrosion, United States Department of Commerce, Sinclair Weeks, Secretary, National Bureau of Standards, A.V. Astin, Director, National Bureau of Standards Circular 579, Issued Apr. 1957, pp. 80 and 83.
Designation: B 33-94, Standard Specification for Tinned Soft or Annealed Copper Wire for Electrical Purposes, published Spetember 1994, originally published as B 33-19 T. Last previous edition B33-91. Annual Book of ASTM Standards, vol. 02.01 & vol. 02.03.
IEEE Guide for Safety in AC Substation Gounding, IEEE Standards Association, IEE Power and Energy Society, sponsored by the Substations Committee, IEEE Std 80™-2013, New York, NY, (Revision of IEEE Std 80-2000/ Incorporates IEEE Std 80-2013/ Cor Jan. 2015, pp. 31, 32, 51, 89, 90, 121, 126, 127, copyright 2015.
Guide for Safety in Alternating-Current Substation Grounding, published by American Institute of Electrical Eningeers, New York, NY, AIEE No. 80, Mar. 1961, pp. 5, 16, 18, 19, 22, 48, 77, 112, 114, 117,.118, 121 and 123.
Dwight, Herbert Bristol, The Calculation of Resistances to Ground and of Capacitance, Massachusetts Institute of Technology, and New England Power Construction Company, pp. 50, 67 and 68, Journal of Mathematics and Physics, Apr. 1931.
Dwight, H.B., Calculation of Resistances to Ground, Massachusetts Institute of Technology, Cambridge, Dec. 1936, pp. 1319-1325, downloaded from IEEE Xplore.
Rüdenberg, Reinhold, Grounding Principles and Practice I—Fundamental Considerations on Ground Currents, Electrical Engineering, vol. 64, No. 1, Jan. 1945, pp. 1 and 8, downloaded from IEEE Xplore.
Gross, E.T.B et al., Grounding Grids for High-Voltage Stations, Aug. 1953, pp. 799 and 805, downloaded from IEEE Eplore.
Koepfinger, IEEE Guide for Safety in Subtation Grounding, IEEE Std 80-1976, published by the Institute of Electrical and Electronics Engineers, Inc. New York, NY, USA, Jun. 30, 1976, pp. 16 and 19, downloaded from IEEE Xplore.
Logan, Kirk H., Soil-Corrosion Studies, 1934. Rates of Loss of Weight and Penetration of Nonferrous Materials, U.S. Department of Commerce, National Bureau of Standards, Research Paper RP945, Part of Journal of Research of the National Bureau of Standards, vol. 17, Nov. 1936, pp. 781,782,796 and 797.
Peters, O.S., Ground Connections For Electrical Systems, Department of Commerce, Technologic Papers of the Bureau of Standards, S. W. Stratton, Director, No. 108, Washington Government Printing Office, 1918, Washington, D. C., pp. 65-67, 78-80, 85-87.
"Getting down to earth . . ." A Manual on Earth-Resistance Testing for the practical man, James G. Biddle Instruments, Blue Bell, Pennsylvania, Fourth Edition, Apr. 1981, pp. 2-3, 24-25, 46-47.
Southey, Robert D et al., Taking the Heat: IEEE Standard 80 and Bimetallic Conductors, Copyright Material IEEE, Paper No. PCIC-DE-070, © 2022 IEEE, pp. 1-7.
Bare Copper Wire and Cable, Bare Copper Conductors Solid and Standard Brochure, Southwire Cabletech Support™, IWCable TechSupport@southwire.com, Carrolton, GA, © 2021Southwire Company, LLC.
Unicable-copper clad aluminum, https://uni-groundrod.com/Earthing-Systems/Ground-Conductors/copper-earth-strip-earthing-strip-grounding-strip.html.
Copperweld, https://www.copperweld.com/products/power-grid/markets.
Xinchang Shibang New Material Co., Ltd., Copper bonded steel earthing bar, https://www.xcshibang.com/copper-bonded-steel-earthing-tape-copper-flat-bar.html.
Copper bonded steel tape coil for earth rod factory, https://www.sltup.com/Copper-Bonded-Steel-Tape-Coil-For-Earth-Rod-Factory-Price-China-Manufacturer.html.

* cited by examiner

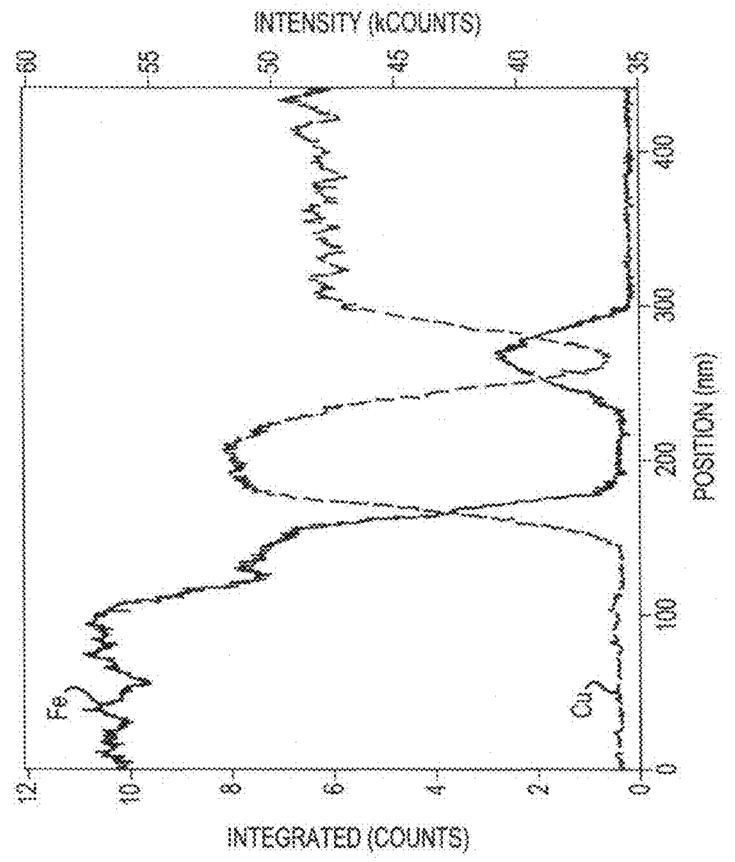
FIG. 6B
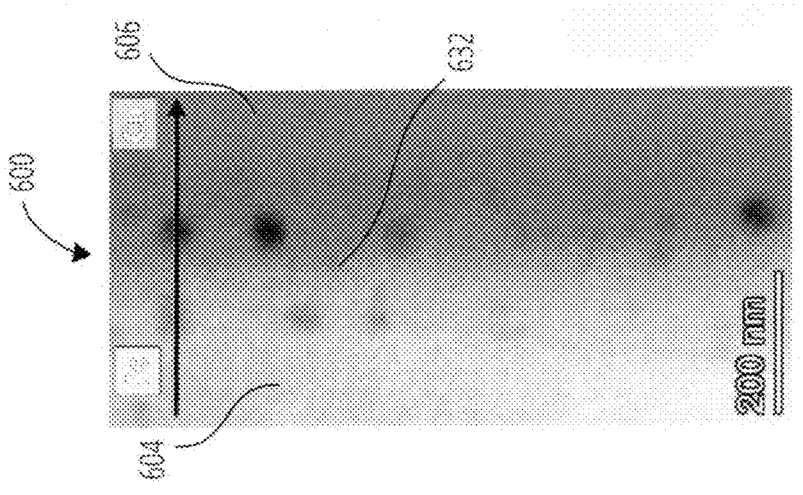

GROUND CONDUCTOR WITH STEEL CORE, COPPER SHEATH, AND WIDTH TO THICKNESS RATIO OF AT LEAST 11:1

CROSS REFERENCE TO RELATED APPLICATIONS

This application claims the benefit of U.S. Provisional Patent App. No. 63/603,590, filed Nov. 28, 2023, the entire disclosure of which is hereby incorporated by reference herein.

BACKGROUND

Ground conductors are essential components in many electrical systems. Ground conductors can provide a safe path for fault currents to return to the ground, thereby preventing electrical shock and equipment damage. Traditionally, ground conductors are made from materials like copper or aluminum due to their excellent conductivity and durability.

Since the Age of Enlightenment, the Earth itself has been used as an economic common return path for experimentation with electricity. A grounding circuit requires both metal conductors and conductive soil to function. There are two competing understandings of electrical grounding discussed by electrical grounding experts today. The origins of both trace to the development of electrically transmitted communications, i.e., telegraph and telephone. For short transmission lines, less than a few miles long, some have modeled the Earth as one-half of the conducting chain forming the circuit with the line wire. For long transmission lines, the Earth has been considered an infinitely large conductor that is capable of absorbing the electricity as fast as it is developed.

Prior to 1950, installation of a 4/0 copper ground grid under a substation was very unusual. Common practice was to drive electrodes (ground rods), deeply into the soil and connect them directly to electrical transmission equipment. For example, in 1952 a proficient engineer from General Electric designed a grounding grid for a hydroelectric power plant built on impenetrable bedrock near the Colorado River in Texas considered the resistance to ground for several grid designs including metal strips in a grid, metal wires in a grid, and isolated plates. His analysis ultimately suggested the most economic and effective grid was made of 0.025-inch copper thread (No. 22 AWG gauge copper wire) in a two-foot grid net dropped in a reservoir to form a mesh that approximates the performance of a series of two-foot square plates in the water above the dam.

But in 1954, the predecessor to the IEEE Standard 80 Guide for Safety in AC Substation Grounding established the now-familiar standard ground grid. That standard ground grid includes twenty-foot centers buried twelve to eighteen inches deep with a ground rod electrode set at each of the four corners of the overall system. It also recommended the use of I/O copper for brazed joints but recognizes that industry has set the 4/0 copper as a minimum for mechanical reasons.

Electric utilities throughout the world are worried about theft of the copper that constitutes their 4/0 copper ground conductors, and the likelihood of increased crime with the high price copper. The U.S. Department of Energy estimated in 2006 that copper theft conservatively totaled $900 million USD per year in the United States. Several large utilities documented their losses from copper theft at $1 million/year. The average price of copper has increased from $3.25/lb in 2006 to $4.50/lb in 2024, worsening the problem today. Copper theft of ground conductors is not limited to the US. For example, South Africa uses similar copper ground conductors. One public utility there estimates its losses to cable theft in recent years at $20 million to $30 million USD per year.

BRIEF SUMMARY

The predominant type of ground conductor used today (e.g., 4/0 copper) is a cylindrically-shaped bundle of cylindrically-shaped strands. Each of the cylindrically-shaped strands are formed substantially, or entirely, of copper. These traditional ground conductors have good electro-thermal capacities, are easy to work with, store, and transport, and have decent corrosion resistance in the ground. Nevertheless, copper is an expensive material and traditional ground conductors formed almost entirely of copper are thus expensive to manufacture. Moreover, traditional ground conductors formed almost entirely of copper are also attractive targets for theft, because the valuable copper can be easily stripped from the ground conductor. End users are also demanding longer grounding system lifetimes and traditional ground conductors have been known to fail sooner than such end users are demanding.

Accordingly, there exists a need for ground conductors with reduced amounts of valuable materials (e.g., copper) and/or that make it more difficult to strip the valuable materials from the ground conductor and that have a longer lifetime underground than traditional ground conductors. The needed ground conductors should also perform at least as well as traditional ground conductors and should be comparably easy to work with, store, and transport as traditional ground conductors. Aspects of this disclosure are directed to ground conductors that address those needs.

One aspect of this disclosure is directed to a ground conductor that includes a core made of at least 95% steel by weight and a sheath surrounding the core. The sheath may include at least one layer, the at least one layer being made of a least 95% copper by weight, The ground conductor has a ground conductor width and a ground conductor thickness. A ratio of the ground conductor width to the ground conductor thickness is at least 11.1:1. Implementations may include one or more of the following features.

The ground conductor thickness is between 0.070 inches and 0.100 inches, inclusive, and the at least one layer of the sheath has a sheath thickness between 0.015 inches and 0.030 inches, inclusive.

The ground conductor may include: a first ground conductor side that extends longitudinally along a longitudinal axis of the ground conductor; a second ground conductor side that extends longitudinally along the longitudinal axis; a third ground conductor side that extends longitudinally along the longitudinal axis; and a fourth ground conductor side that extends longitudinally along the longitudinal axis, where: the first ground conductor side opposes the third ground conductor side, the second ground conductor side opposes the fourth ground conductor side, the first ground conductor side is at least eleven times as long as each of the second ground conductor side and the fourth ground conductor side, the ground conductor thickness is measured between opposing locations on the first ground conductor side and on the third ground conductor side, the ground conductor width is measured between opposing locations on the second ground conductor side and on the fourth ground conductor side, and the sheath surrounds the core continuously and circumferentially around the longitudinal axis such that the sheath encapsulates each of the first ground conductor side, the second ground conductor side, the third ground conductor side, and the fourth ground conductor side.

The at least one layer of the sheath may include an inner sheath surface and an outer sheath surface that opposes the inner sheath surface. The inner sheath surface faces the core, the outer sheath surface faces outwardly, and the sheath thickness is measured between opposing locations on the inner sheath surface and on the outer sheath surface.

The core has a core width and a core thickness, and a ratio of the core width to the core thickness is greater than the ratio of the ground conductor width to the ground conductor thickness. The ratio of the core width to the core thickness is at least 15.0:1.

The ground conductor has an interface region between the core and the at least one layer of the sheath. The interface region may include steel from the core and copper from the sheath that are diffusion-bonded together. At least a portion of the interface region has a thickness greater than 100 nm.

The ground conductor may include only one strand. The sheath may include only one layer and the at least one layer is the only one layer.

The ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 15:1 and 20.1:1, inclusive, and the ground conductor has an electro-thermal capacity of between 357 $I^2t$ and 436 $I^2t$, inclusive. The copper of the sheath has a linear weight of between 0.17 lbs/ft and 0.21 lbs/ft, inclusive. The ground conductor has a resistance to ground of between 0.077 Ω/kft and 0.094 Ω/kft, inclusive. The ground conductor has a break load of between 4038 lbs and 4936 lbs, inclusive. The core has a core width and a core thickness, and a ratio of the core width to the core thickness is between 6:1 and 137.8:1, inclusive.

The ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 22.5:1 and 39.3:1, inclusive, and the ground conductor has an electro-thermal capacity of between 955 $I^2t$ and 1167 $I^2t$, inclusive. The copper of the sheath has a linear weight of between 0.37 lbs/ft and 0.45 lbs/ft, inclusive. The ground conductor has a resistance to ground of between 0.072 Ω/kft and 0.089 Ω/kft, inclusive. The ground conductor has a break load of between 7886 lbs and 9638 lbs, inclusive. The core has a core width and a core thickness, and a ratio of the core width to the core thickness is between 31.3:1 and 272.0:1, inclusive.

The ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 39.7:1 and 69.4:1, inclusive, and the ground conductor has an electro-thermal capacity of between 2470 $I^2t$ and 3018 $I^2t$, inclusive. The copper of the sheath has a linear weight of between 0.69 lbs/ft and 0.85 lbs/ft, inclusive. The ground conductor has a resistance to ground of between 0.069 Ω/kft and 0.084 Ω/kft, inclusive. The ground conductor has a break load of between 13927 lbs and 17022 lbs, inclusive. The core has a core width and a core thickness, and a ratio of the core width to the core thickness is between 55.9:1 and 482.7:1, inclusive.

The ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 59.3:1 and 103.5:1, inclusive, and the ground conductor has an electro-thermal capacity of between 5041 $I^2t$ and 6161 $I^2t$, inclusive. The copper of the sheath has a linear weight of between 1.05 lbs/ft and 1.29 lbs/ft, inclusive. The ground conductor has a resistance to ground of between 0.066 Ω/kft and 0.081 Ω/kft, inclusive. The ground conductor has a break load of between 20770 lbs and 25385 lbs, inclusive. The core has a core width and a core thickness, and a ratio of the core width to the core thickness is between 83.8:1 and 721.3:1, inclusive.

Various additional features and advantages of this invention will become apparent to those of ordinary skill in the art upon review of the following detailed description of the illustrative embodiments taken in conjunction with the accompanying drawings.

BRIEF DESCRIPTION OF THE SEVERAL VIEWS OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings:

FIG. 6B illustrates another image and trace lines of the other ground conductor.

DETAILED DESCRIPTION

Demand for electrical power is experiencing significant growth, such as for servers, data centers, television, telephone, cellular services, etc. Sometimes distinct electrical power sources (e.g., power generators such solar, wind, nuclear, fossil fuel sources, among others, transmission lines, utility substations, etc.) can be located in close proximity to each other. As one example, a data center may have an independent power generation facility associated therewith that can be close to a substation of a local electric grid. In this example, both high power sources can deliver energy to grounding systems buried beneath the respective power facilities. Various power generators, transmitters, transformers, among other possibilities require grounding systems to safely discharge power to ground under certain conditions. As the demand for electrical power grows, so grows the demand for such grounding systems.

Figure 1:
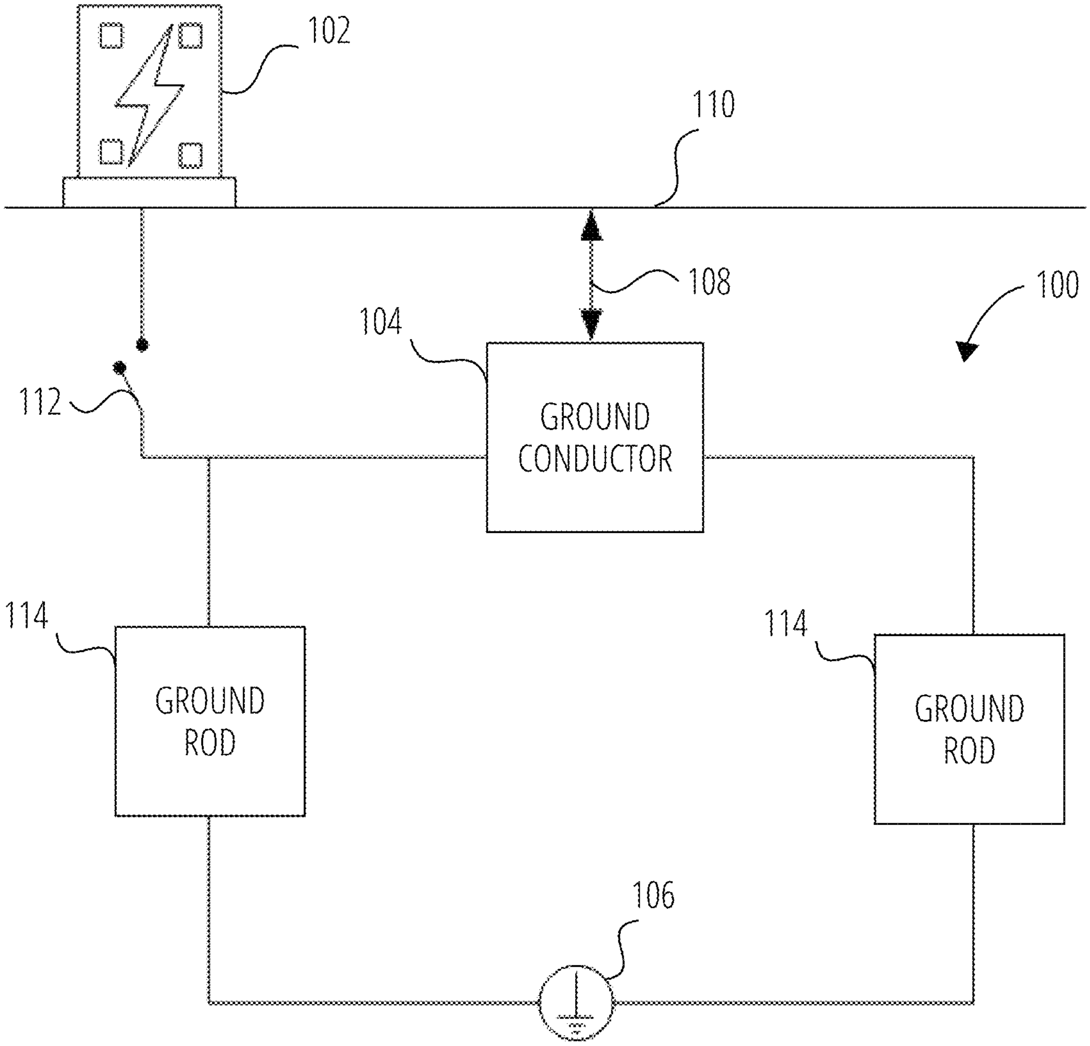
FIG. 1 illustrates a schematic view of a grounding system.

FIG. 1 shows an example grounding system 100 for discharging electrical power to ground. The grounding system 100 can include a power source 102, such as a generator, a transmitter, a transformer, a transfer station, a utility pole, combinations thereof, among other possibilities. The grounding system 100 can further include a ground conductor 104 that can electrically connect the power source 102 to ground 106 to safely discharge the electrical power under certain conditions. The grounding system 100 can include any number of ground conductors 104 and the ground conductors 104 can be connected in electrical communication (e.g., in series or in parallel). The ground conductor 104 can be buried within the earth at a depth 108 (e.g., 18 inches) beneath the ground surface 110. In embodiments, the ground conductor 104 can extend longitudinally beneath the earth in a direction generally parallel to the ground surface 110.

The grounding system 100 can further include a switch 112, such as for example an arrestor (e.g., a lightning arrestor). For example, the switch 112 can be a semiconductor that can be insulative below certain electric potentials and conductive above certain other electric potentials. The grounding system 100 can be biased in an open configuration (e.g., can be electrically insulative), whereby the switch 112 is open and the power source 102 remains disconnected from ground 106. The grounding system 100 can automatically or manually transition to a closed configuration (e.g., can be electrically conductive), whereby the switch 112 is closed and the power source 102 is connected to ground 106 via the ground conductor 104. For example, an electrical surge at the power source 102 (e.g., caused by lightning) can automatically close the switch 112 (e.g., the switch can transition from electrically insulative to electrically conductive in response to the electrical surge), which can transition the grounding system 100 to the closed configuration and allow the electrical surge to safely discharge from the power source 102 to ground 106 via the ground conductor 104. The grounding system 100 can thus neutralize electrical hazards by safely discharging electrical power to the ground 106 under certain scenarios.

In embodiments, the grounding system 100 can further include one or more grounding ground rods 114. The ground rods 114 can be electrically connected to the ground conductor 104 and can extend deeper into the earth than the depth 108 that the ground conductor 104 is buried. According to this configuration, the grounding system 100 can discharge electrical power deeper into the earth. The ground rods 114 can extend longitudinally in a direction generally perpendicular to the ground surface 110 and generally perpendicular to the longitudinal extending direction of the ground conductor 104 buried at the depth 108 beneath the ground surface 110.

Grounding systems, such as the grounding system 100, are used for a variety of different applications. For example, electrical distribution poles that bring power to homes and business can be connected to grounding systems in some form. Grounding systems are also ubiquitous just under the surface of high voltage transmission and distribution substations that carry high voltage power. The close proximity of different sources of high voltage energy, i.e., high potential energy, can cause undesirable and/or unintended interactions with each other. Such interactions can cause high-power currents, i.e., high electrical (kinetic) energy, to pass through persons or equipment when circuits are completed between any two sources of potential energy that are not at equivalent potential. These high-power currents can be fatal. Accordingly, organizations must account for both traditionally recognized local hazards (e.g., such as hazards for workers within a substation caused by the potential energy of utility company equipment) and other external sources of energy that are proliferating to satisfy increased demands for electrical power (e.g., external sources of energy induced upon grounding equipment from nearby high-power micro-grids owned and operated by other organizations).

Figure 2:
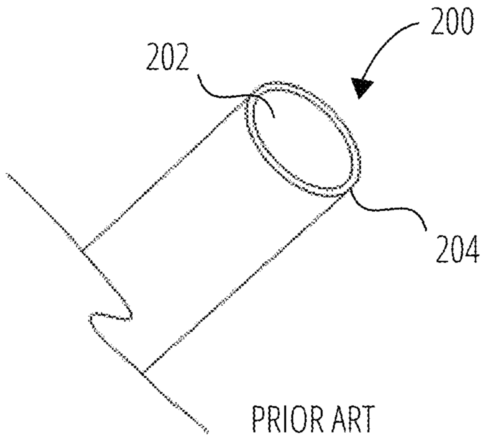
FIG. 2 illustrates a schematic view of a known ground rod.

FIG. 2 shows a schematic view of a known ground rod 200. The known ground rod 200 is one example of the ground rod 114 described previously and can include any of the aspects of the ground rod 114, previously described. The known ground rod 200 can include a cylindrically-shaped core 202 formed of a first material (e.g., steel) and a cylindrically-shaped sheath 204 formed of a second material (e.g., copper). The cylindrically-shaped sheath 204 typically has a thickness of 0.010 inches or less. However, some ground rods 200 with copper sheaths having a thickness of 0.010 inches or less have been known to fail (e.g., most or all the copper is consumed by the soil) in certain soils in less than 20 years.

A distinguishing aspect of the known ground rod 200 as compared to some ground conductors (e.g., the ground conductor 104) is its relative thickness and rigidity. The known ground rod 200 is typically stored and transported in significantly shorter lengths than ground conductors. That is because ground rods are typically used to increase the depth that a grounding system extends into the ground (e.g., by about 8 feet for example), while ground conductors are used to form a grid that extends generally parallel to the ground surface. Put differently, grounding systems can require substantially more length of ground conductor than of ground rod. As a result, there is a need to compactly store and transport the comparatively greater lengths of ground conductor, and ground conductors thus must be more bendable than ground rods so as to be wound on spools for compact storage and case of transportation. Additionally, ground rods are typically more rigid than ground conductors. That is because ground rods often are driven into the ground vertically and must be sufficiently rigid to be driven into the ground without bending. Ground conductors are typically buried parallel to the ground and thus do not have the same rigidity design constraints as ground rods.

Figure 3:
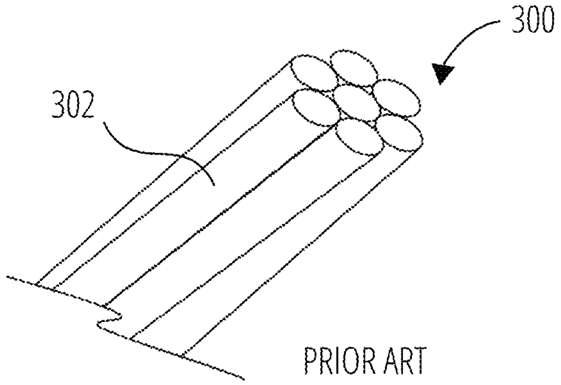
FIG. 3 illustrates a schematic view of a first known ground conductor.

FIG. 3 shows a schematic view of a first known ground conductor 300 used in some grounding systems. The first known ground conductor 300 is one example of the ground conductor 104 described previously and can include any of the aspects of the ground conductor 104 previously described. The first known ground conductor 300 can include a generally cylindrically shaped bundle of cylindrically-shaped strands 302. The cylindrically-shaped strands 302 of the first known ground conductor 300 are formed substantially from copper. That is, the cylindrically-shaped strands 302 can be 100%, by weight, copper or 100%, by weight, copper alloy in which copper is the substantial majority of the alloy. Hereinafter, the term "first known ground conductor" can refer to a ground conductor formed of a generally cylindrically shaped bundle of cylindrically-shaped strands that are each formed substantially or entirely from copper.

The first known ground conductor 300 can come in a variety of different electro-thermal capacities. As would be appreciated by those of skill in the art, the term "electro-thermal capacity", in the context of ground conductors, is a performance characteristic that can refer to the ability of the ground conductor to carry electrical current while managing the heat generated due to electrical resistance. Electro-thermal capacity is independent of the length of the ground conductor and is measured as current squared multiplied by time, or "$I^2t$." Persons of skill in the art will appreciate that there are several techniques for measuring electro-thermal capacity of a ground conductor. One technique can include run-to-fusing tests. Run-to-fusing tests can involve orienting the ground conductor horizontally and suspending the ground conductor in free air (e.g., about 46 inches above the floor of a test cell). Run-to-fusing testing can also include applying current (e.g., 43 kA) to the suspended ground conductor and measuring the time it takes for the ground conductor to fuse. The electro-thermal capacity can be determined by multiplying the measured time to fuse by the square of the applied current. Run-fusing testing be applied at a power frequency of, for example, 60 Hz.

The magnitude of the electro-thermal capacity of the first known ground conductor 300 can be a function of the number of cylindrically-shaped strands 302 in the cylindrically-shaped bundle that defines the first known ground conductor 300. The more cylindrically-shaped strands 302 there are in the cylindrically-shaped bundle, the greater the electro-thermal capacity of the first known ground conductor 300. As explained previously, the first known ground conductor 300 has a cylindrical geometry. That is, a ratio of the total width to the total thickness of the first known ground conductor 300 is roughly 1:1, since the first known ground conductor 300 is generally cylindrically-shaped with a roughly constant diameter.

The first known ground conductor 300, formed substantially or entirely of copper and with the cylindrical geometry, is the dominant type of ground conductor used for grounding systems throughout the world and has been the recommended in the industry going back as least as far as the 1954 edition of the AIEE (American Institute of Electrical Engineers) Grounding Guide (now known as the IEEE (Institute of Electrical and Electronics Engineers) Standard 80 Guide for Safety in AC Substation Grounding). There are many reasons that the first known ground conductor 300 is the dominant type of ground conductor used for grounding systems throughout the world. For example, since copper is a widely available material and is an excellent conductor of electricity, there is a ready supply of effective first known ground conductors 300, formed substantially or entirely of copper and with the cylindrical geometry. Moreover, copper formed in cylindrical geometries is easy to work with. It bends well without breaking and in many cases can be bent without cumbersome tools, such as pipe benders. Accordingly, first known ground conductors 300, formed substantially or entirely of copper and with the cylindrical geometry, are easy to work with and can be wound onto spools for compact storage and transportation. Additionally, first known ground conductors 300, formed substantially or entirely of copper and with the cylindrical geometry, are durable (e.g., mechanically rugged) in soil for many decades. Although copper will corrode in soil over time, since first known ground conductors 300 are formed substantially or entirely of copper, the first known ground conductors 300 can afford to shed some copper without significantly degrading their electro-thermal capacity. Durability or mechanically ruggedness in soil over significant time periods (e.g., in excess of 100 years) is an important design consideration for grounding systems because grounding systems tend to be difficult to access after they are constructed, and end users expect grounding systems to function over significant time periods with little to no maintenance.

Despite the dominance of the first known ground conductor 300 formed substantially or entirely of copper and with the cylindrical geometry, the first known ground conductor 300 has significant drawbacks. One issue with the first known ground conductor 300 formed substantially or entirely of copper and with the cylindrical geometry is the amount of copper required to achieve various electro-thermal capacities. Copper is an expensive material, and all else being equal, it would be desirable to reduce the costs associated with first known ground conductors 300 formed substantially or entirely of copper and with the cylindrical geometry. Relatedly, because copper is expensive and because the first known ground conductors 300 are formed substantially or entirely of copper, first known ground conductors 300 are vulnerable to theft. Theft can be an issue both during storage and installation of the first known ground conductors 300 as well as after installation since some thieves will even dig into the earth to steal first known ground conductors 300 of established grounding systems.

Other types of ground conductors have been evaluated over approximately the last hundred years. But none have been able to put a dent in the dominance of the first known ground conductor 300 formed substantially or entirely of copper and with the cylindrical geometry. For example, in the United States in the early 1950's scientists and engineers considered forming ground conductors substantially or entirety of copper, but with alternative geometries. One alternative geometry considered was an all-copper strip geometry with a ratio of ground conductor width to ground conductor thickness of up to, but not exceeding, 8:1. Such strip-geometry ground conductors formed substantially or entirely of copper were dismissed by the engineers in favor of the cylindrical geometries for a variety of reasons. For example, the 1961 AIEE Grounding Guide indicated that one important performance characteristic, resistance to ground, varies only slightly with area shape. According to that 1961 AIEE Grounding Guide teaching, for two grounding cables that are each formed substantially or entirely of copper with the same surface area but different shapes, such as a strip with a ratio of the ground conductor width to the ground conductor thickness of up to 8:1 as compared to a cylindrical geometry, the resistance to ground should be similar.

The engineers and scientists also concluded that all-copper strip geometries had undesirable mechanical characteristics as compared to the cylindrical geometries of the same surface area. For example, strip geometries for ground conductors formed substantially or entirely of copper were not considered to be sufficiently durable (e.g., mechanically rugged) since they are thinner than a comparable cylindrical shape having the same exposed area. Moreover, the durability or mechanical ruggedness concerns associated with the strip geometries can be exacerbated for ground conductors of greater electro-thermal capacities and as a result strip geometries with a ratio of the ground conductor width to the ground conductor thickness of greater than 8:1 were not considered to be viable. Strip geometries were thus deemed to be insufficiently scalable for ground conductor applications. In contrast, the cylindrical geometries of the first known ground conductor 300 are easily scalable for greater electro-thermal capacities by simply adding more strands to the bundles that form the first known ground conductor 300. And cylindrical geometries can be scaled up for greater electro-thermal capacities without compromising the durability or mechanical ruggedness of the ground conductors.

The 1961 AIEE Grounding Guide concluded that:

> The resistance of a long electrode depends only to a slight extent on its diameter, to such an extent that the gain to be expected from non-circular conductors is generally illusory. Compare, for instance, a one centimeter round conductor and a strip 4 centimeters wide and 0.2 centimeters thick. They have approximately the same cross-section. The strip is equivalent to a two centimeter diameter round conductor, double that of the first one, but for a same buried length of ten meters, the resistance will only differ by 6 percent. The difference would be even more insignificant for longer buried lengths. It is therefore useless to depart from the circular type conductor which is the sturdiest mechanically.

By the 1980's the first known ground conductor 300 was firmly established as the preferred ground conductor and has been consistently recognized as such by, for example, the IEEE Standard 80 Guide for Safety in AC Substation Grounding.

Figure 4:
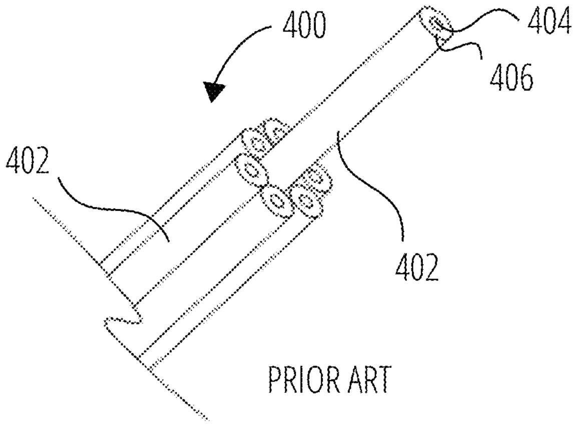
FIG. 4 illustrates a schematic view of a second known ground conductor.

FIG. 4 shows a schematic view of a second known ground conductor 400 that has been considered as an alternative to the first known ground conductor 300. The second known ground conductor 400 can be a composite, cylindrically-shaped ground conductor formed of a number of different materials. For example, the second known ground conductor 400 can be formed of any number of different cylindrically-shaped strands 402 that are bundled together in a substantially cylindrically-shaped bundle. Each of the cylindrically-shaped strands 402 can include a cylindrically-shaped core 404 formed of a first material. The cylindrically-shaped core 404 can be surrounded by a cylindrically-shaped sheath 406 formed of a second material. In one example of the second known ground conductor 400, known as a copper clad steel grounding cable (CCS grounding cable), the cylindrically-shaped core 404 of each of the cylindrically-shaped strands 402 is made of steel and the cylindrically-shaped sheath 406 of each of the cylindrically-shaped strands 402 is made of copper.

The second known ground conductor 400 has some advantages over the first known ground conductor 300. For example, the second known ground conductor 400 can be stronger (e.g., 2 to 3 times stronger) than a first known ground conductor 300 of comparable electro-thermal capacity. Moreover, since high-power current can primarily travel through the outer surface of the cylindrically-shaped strands 402, the second known ground conductor 400 can be manufactured to achieve a given electro-thermal capacity using less copper than a similar first known ground conductor 300 having the same electro-thermal capacity.

Nevertheless, the second known ground conductor 400 has not replaced the first known ground conductor 300 as the dominant ground conductor and is typically not considered to be a viable alternative to the first known ground conductor 300 for several reasons. For example, the second known ground conductor 400 of a given electro-thermal capacity is heavier, less bendable, and more difficult to cut than a comparable first known ground conductor 300 of the same electro-thermal capacity. That can make the second known ground conductor 400 more difficult to work with and more difficult to store and transport since it cannot be easily wound onto a spool. Moreover, the second known ground conductor 400 can be less durable than a comparable first known ground conductor 300 since the cylindrically-shaped sheath 406 can corrode in the soil over time. For at least those reasons, the second known ground conductor 400 is not widely used and the first known ground conductor 300, formed substantially or entirely of copper and with the cylindrical geometry, remains the dominant standard for ground conductors.

There exists a need for a new ground conductor that uses less precious material (e.g., copper) than the first known ground conductor 300, but with at least similar performance (e.g., electro-thermal capacity) and workability (e.g., ability to bend sufficiently to be wound onto a spool for storage or transport, ability to be cut onsite using existing tools, etc.) as the first known ground conductor 300. Additionally, there exists a need for a new ground conductor that has a longer lifetime underground than the first known ground conductor 300. Aspects of this disclosure are directed to ground conductors that satisfy those needs. Such ground conductors can include a core formed of at least a first material (e.g., steel) and a sheath surrounding the core made of a second material (e.g., copper). A ratio of the ground conductor width to the ground conductor thickness is at least 11.1:1. Implementations also include a ground conductor thickness range and a sheath thickness range that balance industry needs, such as for workability and mechanical ruggedness.

Figure 5A:
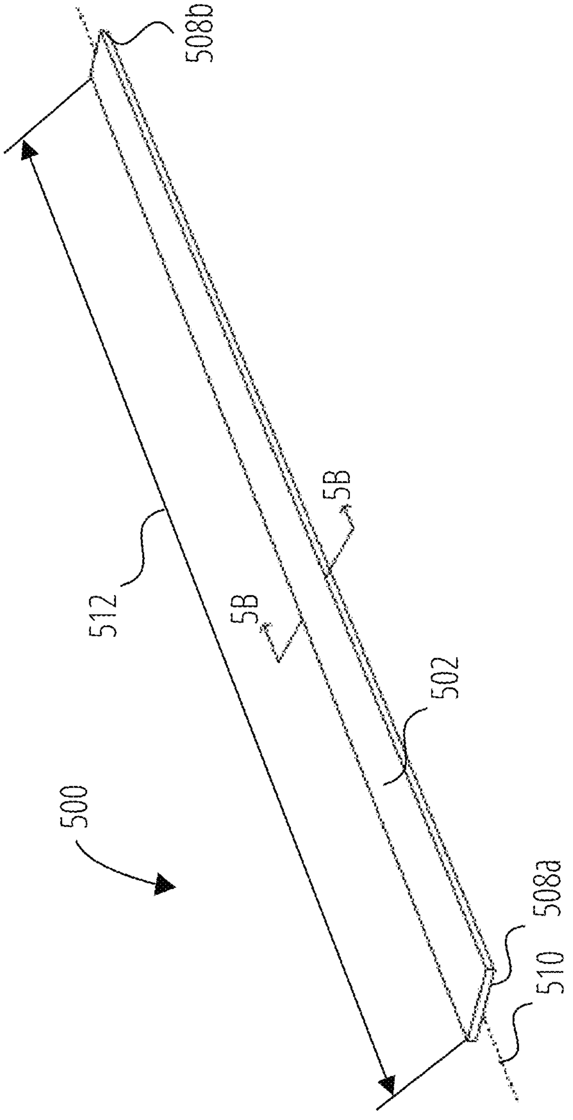
FIG. 5A illustrates a schematic perspective view of a ground conductor according to aspects of this disclosure.
Figure 5B:
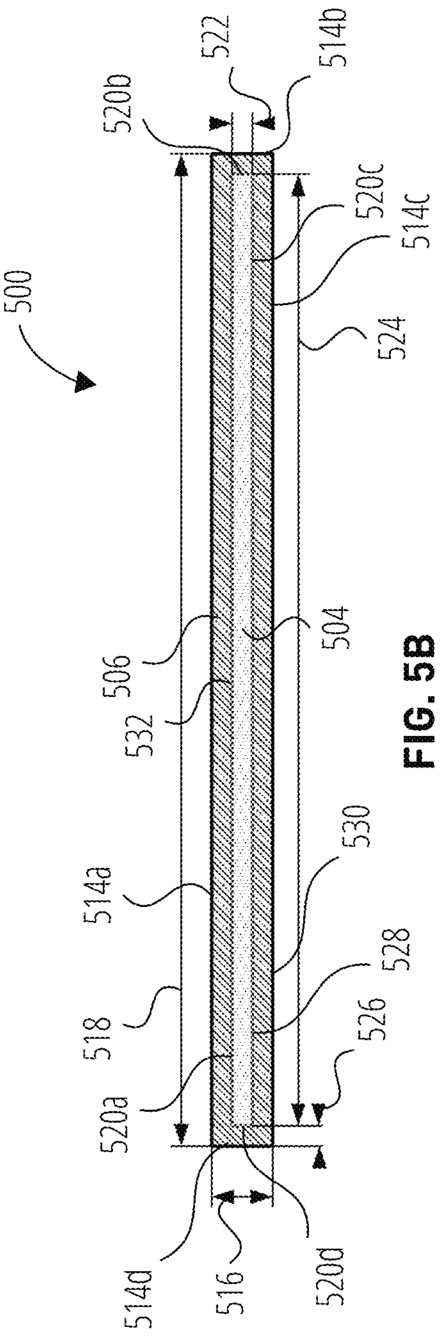
FIG. 5B illustrates a cross-section view of the ground conductor of FIG. 5A taken along the line 5B-5B.

FIG. 5A shows a schematic view of a ground conductor 500 according to aspects of this disclosure. FIG. 5B shows a cross-section view of the ground conductor 500 of FIG. 5A taken along the line 5B-5B. The ground conductor 500 can be a single strand 502. That is, in contrast to the first known ground conductor that is defined by a cylindrically-shaped bundle of cylindrically-shaped strands, the ground conductor 500 can be integral, e.g., can include one only strand 502 that extends along a longitudinal axis 510 of the ground conductor 500. Multiple single strand 502 ground conductors 500 can be connected end-to-end to form a grid of a grounding system (e.g., the grounding system 100 previously described). The ground conductor 500 can have an electro-thermal capacity of at least 340 $I^2t$, as described further hereinafter.

The ground conductor 500 can include a core 504 and a sheath 506 that surrounds the core 504. The ground conductor 500 can include a first ground conductor end **508*a* and a second ground conductor end 508*b* that is opposite the first ground conductor end 508*a*, as shown in FIG. 5A. A longitudinal axis 510 of the ground conductor 500 can run though each of the first ground conductor end 508*a* and the second ground conductor end 508*b*. The second ground conductor end 508*b* can be spaced apart from the first ground conductor end 508*a* along the longitudinal axis 510 of the ground conductor 500**.

The ground conductor 500 can have a length, which can be referred to herein as a ground conductor length 512. The ground conductor length 512 can refer to the dimension of the ground conductor 500 that measures the extent of the ground conductor 500 from the first ground conductor end **508*a* to the second ground conductor end 508*b*. It is to be understood that the ground conductor length can vary between different opposing locations of the ground conductor 500** in accordance with normal manufacturing tolerances. As such, the term "ground conductor length" can refer to an average of any number of different ground conductor length measurements taken between any number of different opposing locations between the first ground conductor end

508*a* and the second ground conductor end 508*b*. The ground conductor length 512 can depend upon a number of factors including local needs, spool sizes, among other possibilities.

The ground conductor 500 can include a plurality of sides that surround the longitudinal axis 510. For example, the ground conductor 500 can have four sides: a first ground conductor side 514*a*, a second ground conductor side 514*b*, a third ground conductor side 514*c*, and a fourth ground conductor side 514*d*, as shown in FIG. 5B. The first ground conductor side 514*a* and the third ground conductor side 514*c* can oppose each other and the second ground conductor side 514*b* and the fourth ground conductor side 514*d* can oppose each other. The first ground conductor side 514*a* can directly interface with each of the second ground conductor side 514*b* and the fourth ground conductor side 514*d*. The third ground conductor side 514*c* can also directly interface with each of the second ground conductor side 514*b* and the fourth ground conductor side 514*d*. Any or each of the plurality of sides of the ground conductor 500 can be flat or curved. The first ground conductor side 514*a* can be at least eleven times as along as each of the second ground conductor side 514*b* and the fourth ground conductor side 514*d*. The third ground conductor side 514*c* can be at least eleven times as along as each of the second ground conductor side 514*b* and the fourth ground conductor side 514*d*.

The ground conductor 500 can have a thickness, which can be referred to herein as a ground conductor thickness 516. The ground conductor thickness 516 can refer to the dimension of the ground conductor 500 that measures the extent of the ground conductor 500 from the first ground conductor side 514*a* to the third ground conductor side 514*c*. It is to be understood that the ground conductor thickness 516 can vary between different opposing locations between the first ground conductor side 514*a* and the third ground conductor side 514*c* in accordance with normal manufacturing tolerances. As such, the term "ground conductor thickness" can refer to an average of any number of different ground conductor thickness measurements taken between any number of different opposing locations between the first ground conductor side 514*a* and the third ground conductor side 514*c*.

The ground conductor 500 can have a width, which can be referred to herein as a ground conductor width 518. The ground conductor width 518 can refer to the dimension of the ground conductor 500 that measures the extent of the ground conductor 500 from the second ground conductor side 514*b* to the fourth ground conductor side 514*d*. It is to be understood that the ground conductor width 518 can vary between different opposing locations between the second ground conductor side 514*b* and the fourth ground conductor side 514*d* in accordance with normal manufacturing tolerances. As such, the term "ground conductor width" can refer to an average of any number of different ground conductor width measurements taken between any number of different opposing locations between the second ground conductor side 514*b* and the fourth ground conductor side 514*d*. A ratio of the ground conductor width 518 to the core thickness 516 can be at least 11.1:1.

The core 504 can be formed of a first material. In embodiments, the core 504 can be formed only of the first material such that the first material accounts for 100% of the core 504 by weight. In embodiments, the first material can account for less than 100% of the core 504 by weight, including 95% by weight, between 95% and 100% by weight, among other possibilities. The first material can be formed of a single element or of several different elements or components that are combined in a permanent manner such that the several different elements or components are inseparable without destroying the first material. For example, the first material can be formed of several component materials homogenously mixed such that the components are uniformly mixed at the atomic level (e.g., an alloy), bonded together chemically, fused together, among other possibilities. In embodiments, the first material can be steel (e.g., carbon steel, dead soft annealed A1008 steel, stainless steel, among other possibilities), nickel-iron alloy (e.g., 36% nickel with a substantial majority of the balance comprising iron), brass, aluminum, combinations thereof, among other possibilities. Hereinafter, embodiments of this disclosure can be described with the core 504 being formed of steel. It is to be understood that the "steel" of such embodiments can be carbon steel, dead soft annealed A1008 steel, stainless steel, among other possibilities. The steel of such embodiments can be pure steel (e.g., a steel alloy including more than 99% steel by weight), steel alloy including at least 90% steel by weight, steel alloy including at least 95% steel by weight, steel alloy including at least 97% steel by weight, steel alloy including at least 99% steel by weight, among other possibilities. Moreover, although the disclosure described with the core 504 formed of steel at least includes embodiments of the core 504 formed of steel, it is to be understood that this disclosure is not limited to only the core 504 formed of steel and that the core 504 can, in additional or alternative embodiments, be formed of any previously described first material. Still further, the embodiments of this disclosure described with the core 504 formed of steel can include any of the features, structures, or relationships described previously with respect to the first material.

The core 504 can include a plurality of sides that surround the longitudinal axis 510. For example, the core 504 can include a first core side 520*a*, a second core side 520*b*, a third core side 520*c*, and a fourth core side 520*d*, as shown in FIG. 5B. The first core side 520*a* and the third core side 520*c* can oppose each other and the second core side 520*b* and the fourth core side 520*d* can oppose each other. The first core side 520*a* can directly interface with each of the second core side 520*b* and the fourth core side 520*d*. The third core side 520*c* can also directly interface with the each of the second core side 520*b* and the fourth core side 520*d*. Any or each of the plurality of sides of the core 504 can be flat or curved. The first core side 520*a* can be at least fifteen times as long as each of the second core side 520*b* and the fourth core side 520*d*. The third core side 520*c* can be at least fifteen times as long as each of the second core side 520*b* and the fourth core side 520*d*.

The core 504 can have a thickness, which can be referred to herein as a core thickness 522. The core thickness 522 can refer to the dimension of the core 504 that measures the extent of the core 504 from the first core side 520*a* to the third core side 520*c*. It is to be understood that the core thickness 522 can vary between different opposing locations between the first core side 520*a* and the third core side 520*c* in accordance with normal manufacturing tolerances. As such, the term "core thickness" can refer to an average of any number of different core thickness measurements taken between any number of different opposing locations between the first core side 520*a* and the third core side 520*c*.

The core 504 can have a width, which can be referred to herein as a core width 524. The core width 524 can refer to the dimension of the core 504 that measures the extent of the core 504 from the second core side 520*b* to the fourth core side 520*d*. It is to be understood that the core width 524 can vary between different opposing locations between the second core side 520*b* and the fourth core side 520*d* in accordance with normal manufacturing tolerances. As such, the term "core width" can refer to an average of any number of different core width measurements taken between any number of different opposing locations between the second core side 520*b* and the fourth core side 520*d*. A ratio of the core width 524 to the core thickness 522 can be at least 15.0:1. This can be advantageous as it can improve structural integrity, durability, and mechanical ruggedness of the ground conductor 500.

The sheath 506 can surround the core 504. For example, the ground conductor 500 can have a longitudinal axis 510 and the core 504 can include a plurality of sides (e.g., a first core side 520*a*, a second core side 520*b*, a third core side 520*c*, and a fourth core side 520*d*) that extend longitudinally along the longitudinal axis 510. The sheath 506 can surround the core 504 continuously and circumferentially around the longitudinal axis 510 such that the sheath 506 encapsulates each of the plurality of sides of the core 504.

The sheath 506 can be formed of a second material. The second material can have an electrical conductivity that is greater than an electrical conductivity of the first material. The second material can be formed of a single element or of several different elements or components that are combined in a permanent manner such that the several different elements or components are inseparable without destroying the second material. For example, the second material can be formed of several component materials homogenously mixed such that the components are uniformly mixed at the atomic level (e.g., an alloy), bonded together chemically, fused together, among other possibilities. In embodiments, the second material can be pure copper (e.g., oxygen free copper, a copper alloy including more than 99% copper by weight, among other possibilities), copper alloy including at least 90% copper by weight, copper alloy including at least 95% copper by weight, copper alloy including at least 97% copper by weight, copper alloy including at least 99% copper by weight, nickel, nickel alloy, steel (e.g., stainless steel), polymers (e.g., conductive low-density polyethylene), graphene, combinations thereof, among other possibilities. Some or all of the elements or components that form the second material can be different from the elements or components that form the first material. Some or all of the elements or components that form the second material can be the same as the elements or components that form the first material.

In embodiments, the sheath 506 can be formed only of the second material such that the second material accounts for 100% of the sheath 506 by weight. In such embodiments, the sheath 506 can consist of a single layer. In alternative embodiments, the sheath 506 can be multilayered and can include any number of distinct layers. The second material can form a first layer of the sheath 506 and can account for 100% of the first layer by weight. In embodiments, the second material can account for less than 100% of the sheath 506 (e.g., of the first layer or the entirety of the sheath 506) by weight, including 95% by weight, between 95% and 100% by weight, among other possibilities. The term "first layer" and "at least one layer" can be used interchangeably herein to refer to the same layer of the sheath 506, which in embodiments can be the only layer of the sheath 506 and in alternative embodiments can be a first or innermost layer of the sheath 506. The first layer can directly interface with the core 504, and any additional layers of the sheath 506 can be formed outwardly relative to the first layer. For example, in embodiments the sheath 506 can include a second layer formed of a third material. The second layer can, in embodiments, protect the first layer from corrosion. The third material can be formed of a single element or of several different elements or components that are combined in a permanent manner such that the several different elements or components are inseparable without destroying the third material. For example, the third material can be formed of several component materials homogenously mixed such that the components are uniformly mixed at the atomic level (e.g., an alloy), bonded together chemically, fused together, among other possibilities. In embodiments, the third material can be tin, tin alloy, among other possibilities.

Hereinafter, embodiments of this disclosure can be described with the sheath 506 being formed of copper. Such description can be directed to the at least one layer or first layer, previously described. It is to be understood that the "copper" of such embodiments can be pure copper (e.g., oxygen free copper, a copper alloy including more than 99% copper by weight, among other possibilities), copper alloy including at least 90% copper by weight, copper alloy including at least 95% copper by weight, copper alloy including at least 97% copper by weight, copper alloy including at least 99% copper by weight, among other possibilities. Although the disclosure described with the sheath 506 formed of copper at least includes embodiments of the sheath 506 formed of copper, it is to be understood that this disclosure is not limited to only the sheath 506 formed of copper and that the sheath 506 can, in additional or alternative embodiments, be formed of any previously described second material. Moreover, the embodiments of this disclosure described with the sheath 506 formed of copper can include any of the features, structures, or relationships described previously with respect to the second material. Still further, it is to be understood that in at least some embodiments of this disclosure described with the sheath 506 formed of copper, the copper can account for 100% of the sheath 506 by weight or the sheath 506 can be multilayered and the copper can be a first layer of the sheath 506, as previously described with respect to the first material.

The sheath 506 can have a thickness, which can be referred to herein as a sheath thickness 526. The sheath thickness 526 can refer to a dimension of the sheath 506 that measures the extent of the sheath between two opposing surfaces of the sheath 506 and can be measured perpendicular to the longitudinal axis 510. For example, the sheath thickness 526 can refer to a dimension of the sheath 506 between opposing locations on an inner sheath surface 528 and on an outer sheath surface 530, respectively. The inner sheath surface 528 can surround the core 504 (e.g., around the longitudinal axis 510) and can interface with the core 504 at an interface region 532, described later. The inner sheath surface 528 can face inwardly towards a center of the ground conductor 500. The outer sheath surface 530 can define an outer boundary of the sheath 506. The outer sheath surface 530 can define the plurality of sides of the ground conductor 500 (e.g., the first ground conductor side 514*a*, the second ground conductor side 514*b*, the third ground conductor side 514*c*, and the fourth ground conductor side 514*d*). The outer sheath surface 530 can surround the inner sheath surface 528 (e.g., around the longitudinal axis 510). It is to be understood that the sheath thickness 526 can vary between different opposing locations between the inner sheath surface 528 and the outer sheath surface 530 in accordance with normal manufacturing tolerances. As such, the term "sheath thickness" can refer to an average of any number of different sheath thickness measurements taken between any number of different opposing locations between the inner sheath surface 528 and the outer sheath surface 530.

As described previously, the ground conductor 500 can have a ground conductor thickness 516. In embodiments, the ground conductor thickness 516 can be between 0.070 inches and 0.100 inches, inclusive. The term "inclusive" as used herein in reference to ranges can mean that the range includes the beginning and ending values of the range as well as any values therebetween. Hereinafter, the term "ground conductor thickness range" can refer to between 0.070 inches and 0.100 inches, inclusive. In embodiments, the ground conductor 500 can include the core 504 in which the first material is steel, the sheath 506 in which the second material is copper, and the ground conductor thickness 516 can correspond to the ground conductor thickness range. That can be advantageous because the workability (e.g., ability to bend sufficiently to be wound onto a spool for storage or transport, ability to be cut onsite using existing tools such as, for example, battery operated hand cutters/shears/nibblers for mild steel sheet metal) of the ground conductor 500 can be similar to the first known ground conductor 300 of comparable electro-thermal capacity. That comparable workability can improve market adoption of the ground conductor 500 since it will feel familiar to end users. For example, the ground conductor 500 (e.g., with the core 504 in which the first material is steel, the sheath 506 in which the second material is copper, and with the ground conductor thickness 516 that corresponds to the ground conductor thickness range) can be bendable enough that it can be wound onto a spool, shaped, etc. in a manner similar to a comparable first known ground conductor 300 of similar electro-thermal capacity. Moreover, the ground conductor 500 (e.g., with the core 504 in which the first material is steel, the sheath 506 in which the second material is copper, and with the ground conductor thickness 516 that corresponds to the ground conductor thickness range) can be cut using similar tools and with the application of similar forces as the comparable first known ground conductor 300 of similar electro-thermal capacity. Still further, the ground conductor 500 (e.g., with the core 504 in which the first material is steel, the sheath 506 in which the second material is copper, and with the ground conductor thickness 516 that corresponds to the ground conductor thickness range) can be sufficiently difficult to cut through that it can be difficult for less experienced or ill equipped persons (e.g., potential thieves) to cut through the ground conductor 500, which can make the ground conductor 500 more difficult to steal.

As described previously, the sheath 506 can have a sheath thickness 526. In embodiments, the sheath thickness 526 can be between 0.015 inches and 0.030 inches, inclusive. Hereinafter, the term "sheath thickness range" can refer to between 0.015 inches and 0.030 inches, inclusive. In embodiments, the second material that forms the sheath 506 can be copper and the sheath thickness 526 can correspond to the sheath thickness range. That can be advantageous because the sheath thickness range can be sufficiently thick such that the copper of the sheath 506 can degrade underground over time (e.g., 100 years or more) without the electro-thermal capacity falling below a minimum required electro-thermal capacity for a given size of the ground conductor 500. For example, the minimum bound of the sheath thickness range (e.g., 0.015) can be at least 50% greater than the thickness of the standard ground rods (e.g., 0.010 inches), to improve the durability and service lifetimes of the ground conductor 500 relative to standard ground rods (e.g., the known ground rod 200). Moreover, the sheath thickness range is not unnecessarily large. That is, because thicknesses outside of (e.g., above) the sheath thickness range can result in diminishing performance returns, the sheath thicknesses above the sheath thickness range can effectively waste expensive copper or other second material since the extra copper or other second material is not efficiently utilized. The sheath thickness range thus strikes a balance between durability underground and efficient utilization of copper or other second material.

In embodiments, the ground conductor 500 can include the core 504 in which the first material is steel, the sheath 506 in which the second material is copper, the ground conductor thickness 516 can correspond to the ground conductor thickness range, and the sheath thickness 526 can correspond to the sheath thickness range. Such embodiments can be advantageous for each of the reasons previously described in reference to the ground conductor thickness range description and the sheath thickness range description.

As described previously, the ground conductor 500 can have a ground conductor width 518. The ground conductor width 518 can be greater than the ground conductor thickness 516. For example, the ratio of the ground conductor width 518 to the ground conductor thickness 516 can be at least 11.1:1. That can be advantageous because the outer surface area of the ground conductor 500 can be greater than the outer surface area of the first known ground conductor 300, which is generally cylindrically shaped. The increase in surface area can improve resistance to ground and can reduce the amount of second material required for a given electro-thermal capacity, as described later.

The core 504 can provide structural support to the ground conductor 500 and can frame the outer shape of the ground conductor 500. That is, the geometric shape of the sheath 506 can correspond to the geometric shape of the core 504. That can be advantageous because the first material of the core 504 can be relatively stiffer than the second material of the sheath 506 and thus the core 504 can structurally support a relatively thin at least one layer of the sheath 506 (e.g., the sheath thickness range) for the lifetime of the ground conductor 500 (e.g., greater than 100 years). Since the geometric shape of the core 504 can correspond to the geometric shape of the sheath 506, the ratio of the core width 524 to the ratio of the core thickness 522 can be greater than the ratio of the ground conductor width 518 to the ground conductor thickness 516. For example, the ratio of the core width 524 to the core thickness 522 can be at least 15.0:1.

The ground conductor 500 can include an interface region 532. The interface region 532 can be between the core 504 and the sheath 506. The interface region 532 can be a portion of the core 504 and a portion of the sheath 506 that are diffusion-bonded together. For example, the interface region 532 can include both the first material and the second material diffusion-bonded together. The interface region 532 can be a distinct region of the ground conductor 500 that is formed entirely of the core 504 and the sheath 506 diffusion-bonded together. For example, in embodiments in which the core 504 is formed of steel and the sheath 506 is formed of copper, the interface region 532 can be a distinct region formed of steel from the core 504 and copper from the sheath 506 that are diffusion-bonded together. That can be advantageous because the copper diffused into the steel can improve the conductivity relative to copper alone, which can reduce the total amount of copper required to achieve a given electro-thermal conductivity. For example, copper diffused into the steel can improve the efficiencies of copper by providing a heat sink that fuses at approximately 1510°

C., as compared to about 1083° C. for copper alone. That can extend the time to fuse and thus improve the electro-thermal conductivity.

The interface region 532 can have a thickness, which can be referred to herein as the interface region thickness. The interface region thickness can be the dimension of the interface region that corresponds to the extent of the interface region from one surface of the interface region to an opposite surface of the interface region and can be measured perpendicular to the longitudinal axis 510. It is to be understood the interface region thickness can vary at different opposing locations in accordance with normal manufacturing tolerances. As such, the term "interface region thickness" can refer to an average of any number of different interface region thickness measurements taken at different opposing locations of the interface region 532. In embodiments, the interface region thickness can be less than 100 nm, 100 nm, between 100 nm and 150 nm, 150 nm, between 150 nm and 200 nm, 200 nm, between 200 nm and 250 nm, 250 nm, between 250 nm and 300 nm, greater than 300 nm, among other possibilities.

Figure 6A:
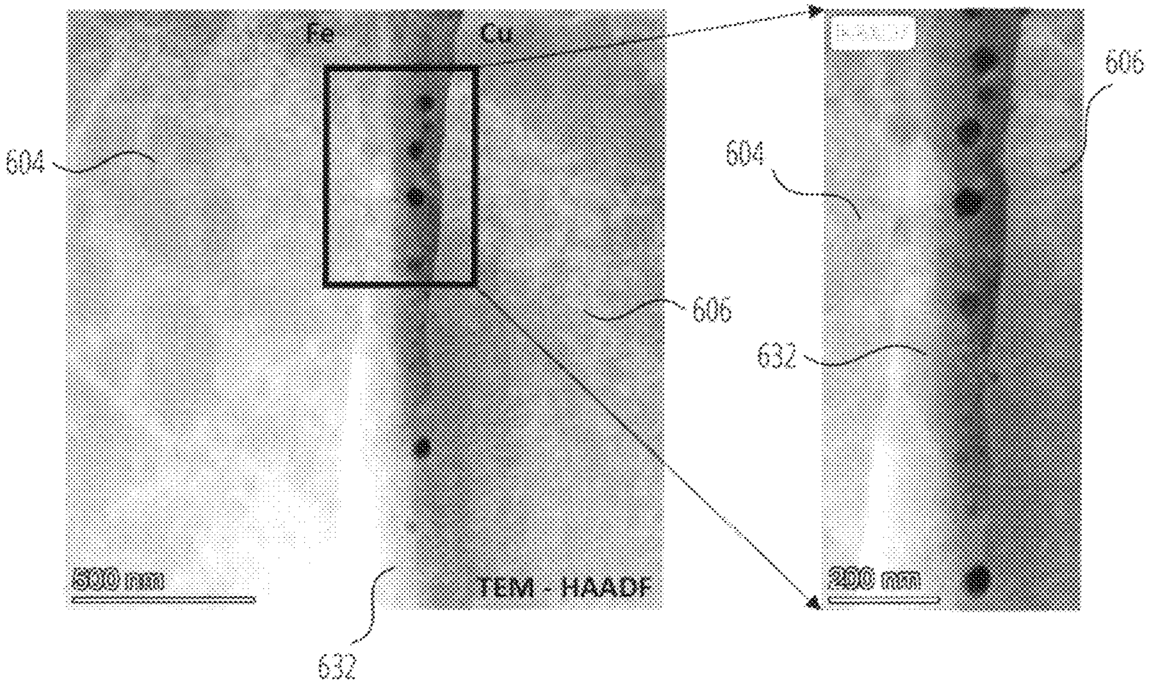
FIG. 6A illustrates an image of another ground conductor according to aspects of this disclosure.

FIG. 6A shows a transmission electron microscope image of a ground conductor 600 according to aspects of this disclosure. The ground conductor 600 can include any, some, or all of the aspects, structures, features, relationships, etc. described previously with respect to the ground conductor 500, and vice versa. For example, the ground conductor 600 can include the core 604, the sheath 606, and the interface region 632. The core 604 can be at least formed of steel, as previously described, and the sheath 606 can be at least formed of copper, as previously described. As shown in FIG. 6A, the interface region 632 can be a distinct region between the core 604 and the sheath 606 formed of steel from the core 604 and copper from the sheath 606 that are diffusion-bonded together.

FIG. 6B shows a composite image of elemental maps from scanning transmission electron microscope images and energy dispersive spectroscopy images of the ground conductor 600 and line traces showing concentrations of iron from the steel of the core 604 and copper from the sheath 606. The composite image and the line traces clearly show the diffusion-bonded, distinct region that defines the interface region 632.

Figure 7A:
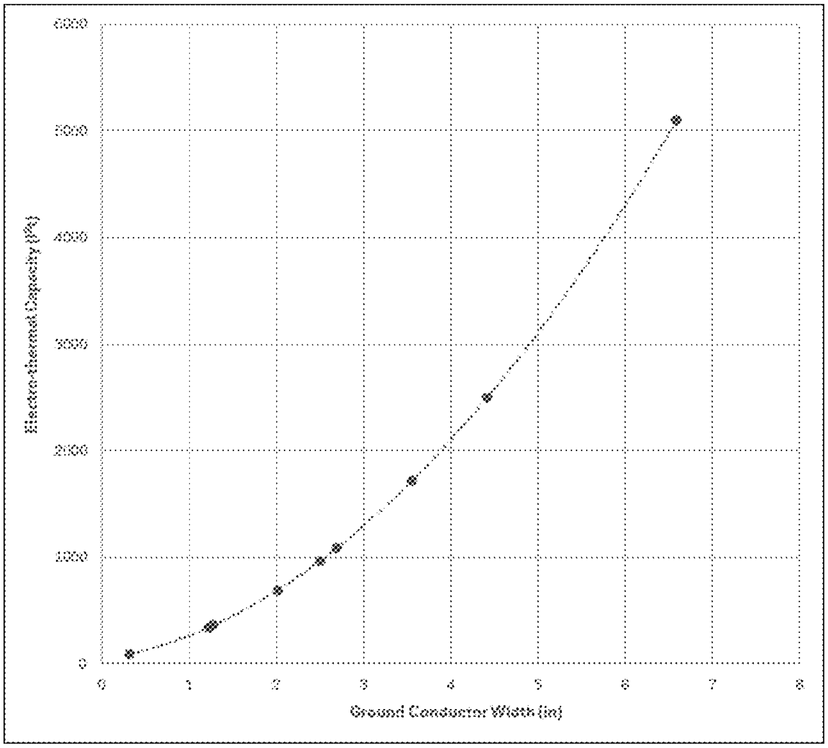
FIG. 7A shows a graph of the relationship between electro-thermal capacity and ground conductor width for ground conductors in accordance with aspects of this disclosure.

FIG. 7A shows a graph of the electro-thermal capacity of the ground conductors of this disclosure as a function of the ground conductor width. The ground conductor data shown in FIG. 7A corresponds to ground conductors of this disclosure (e.g., embodiments of the ground conductor 500 and/or the ground conductor 600) with the core in which the first material is steel, the sheath in which the second material is copper, a ground conductor thickness (e.g., 0.083 inches) within or corresponding to the ground conductor thickness range, and a sheath thickness (e.g., 0.024 inches) within or corresponding to the sheath thickness range. As shown in FIG. 7A, the electro-thermal capacity for example ground conductors of this disclosure can be a predictable function of the ground conductor width.

Table 1 below shows four example ground conductors (Ex. 1, Ex. 2, Ex. 3, and Ex. 4) of this disclosure as compared to four known first ground conductors (First Known Ground Conductor 1 (2/0 AWG), First Known Ground Conductor 2 (4/0 AWG), First Known Ground Conductor 3 (350 kcmil), and First Known Ground Conductor 4 (500 kcmil)) of similar electro-thermal capacity. Each of the example ground conductors of this disclosure (Ex. 1, Ex. 2, Ex. 3, and Ex. 4) can include aspects of the previously described ground conductor 500. For example, each of the example ground conductors of this disclosure (Ex. 1, Ex. 2, Ex. 3, and Ex. 4) can include the core in which the first material is steel, the sheath in which the second material is copper, a ground conductor thickness within or corresponding to the ground conductor thickness range, and a sheath thickness within or corresponding to the sheath thickness range. The example ground conductors of this disclosure (Ex. 1, Ex. 2, Ex. 3, and Ex. 4) are not limited to the values shown in Table 1. Instead, the values shown in Table 1 are in-range example values within a range of possible values associated with each of the example ground conductors of this disclosure (Ex. 1, Ex. 2, Ex. 3, and Ex. 4). Table 2, described later, shows the range of possible values for each of these four example ground conductors of this disclosure (Ex. 1, Ex. 2, Ex. 3, and Ex. 4), and Table 3, also described later, shows the range of values for each of four other example ground conductors of this disclosure (Ex. A, Ex. B, Ex. C, and Ex. D).

The core ground conductor width of the example ground conductors of this disclosure (Ex. 1, Ex. 2, Ex. 3, and Ex. 4) can vary (e.g., based on the function shown in FIG. 7A) to achieve different electro-thermal capacities. The respective disclosed ranges of electro-thermal capacities can be advantageous because they correspond to existing electro-thermal capacities widely used for the four known first ground conductors (2/0 AWG, 4/0 AWG, 350 kcmil, and 500 kcmil), which can improve market adoption of the ground conductors of this disclosure. It can be advantageous to vary the ground conductor width of the ground conductors of the disclosure while maintaining the ground conductor thickness range and/or the sheath thickness range across each ground conductor. That is because varying the ground conductor width of the ground conductors of the disclosure while maintaining the ground conductor thickness range and/or the sheath thickness range across each ground conductor can allow for modification of the electro-thermal capacities of the various ground conductors while maintaining the advantages of the ground conductor thickness range and/or the sheath thickness range, described previously.

TABLE 1

| Characteristic | Unit | Ex. 1 | 2/0AWG | Ex. 2 | 4/0AWG | Ex. 3 | 350 kcmil | Ex. 4 | 500 kcmil |
|---|---|---|---|---|---|---|---|---|---|
| Electro-Thermal Capacity | $I^2t$ | 397 | 361 | 1061 | 965 | 2744 | 2497 | 5601 | 5096 |
| Material | n/a | Cu/Fe | Cu | Cu/Fe | Cu | Cu/Fe | Cu | Cu/Fe | Cu |
| Ground Conductor Thickness | in | 0.083 | 0.41 | 0.083 | 0.53 | 0.083 | 0.68 | 0.083 | 0.81 |
| Ground Conductor Width | in | 1.28 | 0.41 | 2.50 | 0.53 | 4.42 | 0.68 | 6.58 | 0.81 |

TABLE 1-continued

| Characteristic | Unit | Ex. 1 | 2/0AWG | Ex. 2 | 4/0AWG | Ex. 3 | 350 kcmil | Ex. 4 | 500 kcmil |
|---|---|---|---|---|---|---|---|---|---|
| Ratio of Ground Conductor Width to Ground Conductor Thickness | n/a | 15.4:1 | 1:1 | 30.1:1 | 1:1 | 53.2:1 | 1:1 | 79.3:1 | 1:1 |
| Linear Weight of Copper | lbs/ft | 0.19 | 0.41 | 0.41 | 0.64 | 0.77 | 1.07 | 1.17 | 1.54 |
| Linear Weight of Copper v. State of the Art | % | −54% | — | −36% | — | −28% | — | −24% | — |
| Resistance Into Ground | Ω/kft | 0.085 | 0.093 | 0.081 | 0.091 | 0.076 | 0.090 | 0.073 | 0.089 |
| Resistance Into Ground v. State of the Art | % | −8% | — | −12% | — | −15% | — | −18% | — |
| Break Load | lbs | 4487 | 3105 | 8762 | 4933 | 15474 | 8161 | 23077 | 11614 |
| Break Load v. State of the Art | % | 45% | — | 78% | — | 90% | — | 99% | |

As shown in Table 1, the four example ground conductors (Ex. 1, Ex. 2, Ex. 3, and Ex. 4) of this disclosure can each include a ratio of ground conductor width to ground conductor thickness that is greater than 11.1:1. As is further shown in Table 1, this can be advantageous because the four example ground conductors (Ex. 1, Ex. 2, Ex. 3, and Ex. 4) of this disclosure can each demonstrate significant improvements in key ground conductor characteristics relative to the corresponding one of the four known first ground conductors (2/0 AWG, 4/0 AWG, 350 kcmil, 500 kcmil) with a similar electro-thermal capacity. Some key ground conductor characteristics, shown in Table 1 and described throughout this disclosure, include: linear weight of copper (lbs/ft), resistance to ground (§ 2/kft), and break load (lbs). Persons of skill in the art will readily appreciate that the linear weight of copper is measured on earth and can correspond to an amount (e.g., a mass) of copper per linear length of the ground conductor 500.

Resistance to ground ($R_z$) can measure the resistance between the ground conductor and the ground that the ground conductor is buried within. Resistance to ground (e.g., for a ground conductor with a metal outer layer such as copper) can be calculated using the following equation:

$$R_z = \left[\left(\frac{\rho}{2\pi L}\right)\log_e\left(\frac{4L}{W}\right)\right] \times \left[1 + \frac{\log_e\left(\frac{L/2}{z}\right)}{\log_e\left(\frac{L}{T/2}\right)}\right]$$

where:

z=depth that ground conductor is buried in soil=0.5 m

ρ=soil resistivity at z of 0.5 m=100 Ω-m

L=ground conductor length=1000 m

W=ground conductor width

T=ground conductor thickness

Persons of skill in the art will appreciate that the units for $R_z$ as calculated using the above equation are Ω/m, which can be converted to Ω/kft in a standard unit conversion.

Persons of skill in the art will also appreciate that the break load of the ground conductor can be measured by applying a gradually increasing tensile force to the ground conductor until the ground conductor breaks. The break load characteristic can correspond to the tensile force applied to the ground conductor at the time that the ground conductor breaks. The measurement can be conducted using a tensile testing machine, which can record the force applied and the moment of breakage. The break load of a ground conductor can be associated with the durability or mechanical ruggedness of the ground conductor in the ground. That is, the higher break loads are associated with longer lifetimes of the ground conductor in the ground.

Table 1 thus demonstrates that example ground conductors of this disclosure can achieve the same electro-thermal capacity as comparable first known ground conductors, with significantly less copper (e.g., between 24% and 54% less copper), significantly less resistance to ground (e.g., between 8% and 18% less resistance to ground), and significantly higher break loads (e.g., between 45% and 99% higher break loads).

These results were surprising and unexpected. As described previously, the 1961 AIEE Grounding Guide teaches that for two similarly sized all-copper ground conductors, one with a circular geometry and one with a strip geometry of 8:1, the electrical performance characteristics (e.g., resistance to ground) should be similar, but the mechanical ruggedness of the all copper circular geometry rendered the all-copper strip geometry of 8:1 "useless." But this disclosure demonstrates that this finding was misleading.

Surprisingly and unexpectedly, this disclosure shows that ground conductor strip geometries greater than 8:1, which were not evaluated in the AIEE Grounding Guide, including for example 11.1:1 or greater, demonstrate significant electrical performance characteristic improvements (e.g., significantly less resistance to ground including between 8% and 18% less resistance to ground) relative to similarly sized circular geometries. This disclosure also surprisingly and unexpectedly shows that the electrical performance characteristic improvement increases as the ratio of ground conductor width to ground conductor thickness increases. As demonstrated by the improvement in break load, the steel core of this disclosure alleviated the mechanical ruggedness concerns raised by the 1961 AIEE Grounding Guide and others. Moreover, since current is conducted mostly through the outer portions of ground conductors and because the steel improved the heat capacity of the copper sheath, the ground conductors of this disclosure achieved an unexpected reduction in the amount of copper needed to achieve similar electro-thermal conductivities as their comparable all-copper cylindrical counterparts. Because the ground conductors of this disclosure can have the ground conductor thickness range and/or the sheath thickness range, previously described, the example ground conductors can also have similar workability as the first known ground conductors. Thus, the ground conductors of this disclosure represent a significant improvement over the current state of the art (e.g., the first known ground conductor).

Aspects of this disclosure can alternatively be directed to ground conductors with the core in which the first material is steel, the sheath in which the second material is copper, the ground conductor thickness that corresponds to the ground conductor thickness range, the sheath thickness that corresponds to the sheath thickness range, and with the ratio of the ground conductor width to the ground conductor thickness that is less than 11.1:1. Such ground conductors can be useful for some applications. However, with the ratio of the ground conductor width to the ground conductor thickness that is less than 11.1:1 the ground conductors do not represent a significant improvement over existing ground conductors and can include some performance characteristics that are worse than the known ground conductors. For example, ground conductors with the core in which the first material is steel, the sheath in which the second material is copper, the ground conductor thickness that corresponds to the ground conductor thickness range, the sheath thickness that corresponds to the sheath thickness range, and with the ratio of the ground conductor width to the ground conductor thickness that is less than 11.1:1 can have break loads that are lower than comparable first known ground conductors due, at least in part, to small cross-sectional areas that can weaken the ground conductors.

Table 2 below shows additional aspects of the four example ground conductors (Ex. 1, Ex. 2, Ex. 3, and Ex. 4) of this disclosure including minimum, maximum, and an in-range example of various ground conductor characteristics described throughout this disclosure.

TABLE 2

| Characteristic | Unit | Value Type | Ex. 1 | Ex. 2 | Ex. 3 | Ex. 4 |
|---|---|---|---|---|---|---|
| Electro-Thermal Capacity | $I^2t$ | Min | 357 | 955 | 2470 | 5041 |
| | | In-range Example | 397 | 1061 | 2744 | 5601 |
| | | Max | 436 | 1167 | 3018 | 6161 |
| Ground Conductor Thickness | in | Min | 0.070 | 0.070 | 0.070 | 0.070 |
| | | In-range Example | 0.083 | 0.083 | 0.083 | 0.083 |
| | | Max | 0.100 | 0.100 | 0.100 | 0.100 |
| Sheath Thickness | in | Min | 0.015 | 0.015 | 0.015 | 0.015 |
| | | In-range Example | 0.024 | 0.024 | 0.024 | 0.024 |
| | | Max | 0.030 | 0.030 | 0.030 | 0.030 |

TABLE 2-continued

| Characteristic | Unit | Value Type | Ex. 1 | Ex. 2 | Ex. 3 | Ex. 4 |
|---|---|---|---|---|---|---|
| Ground Conductor Width | in | Min | 1.15 | 2.25 | 3.97 | 5.93 |
| | | In-range Example | 1.28 | 2.50 | 4.42 | 6.58 |
| | | Max | 1.41 | 2.75 | 4.86 | 7.24 |
| Ratio of Ground Conductor Width to Ground Conductor Thickness | n/a | Min | 11.5:1 | 22.5:1 | 39.7:1 | 59.3:1 |
| | | In-range Example | 15.4:1 | 30.1:1 | 53.2:1 | 79.3:1 |
| | | Max | 20.1:1 | 39.3:1 | 69.4:1 | 103.5:1 |
| Core Thickness | in | Min | 0.010 | 0.010 | 0.010 | 0.010 |
| | | In-range Example | 0.036 | 0.036 | 0.036 | 0.036 |
| | | Max | 0.070 | 0.070 | 0.070 | 0.070 |
| Core Width | in | Min | 1.09 | 2.19 | 3.91 | 5.87 |
| | | In-range Example | 1.23 | 2.45 | 4.37 | 6.54 |
| | | Max | 1.38 | 2.72 | 4.83 | 7.21 |
| Ratio of Core Width to Core Thickness | n/a | Min | 15.6:1 | 31.3:1 | 55.9:1 | 83.8:1 |
| | | In-range Example | 34.3:1 | 68.1:1 | 121.4:1 | 181.6:1 |
| | | Max | 137.8:1 | 272.0:1 | 482.7:1 | 721.3:1 |
| Linear Weight of Copper | lbs/ft | Min | 0.17 | 0.37 | 0.69 | 1.05 |
| | | In-range Example | 0.19 | 0.41 | 0.77 | 1.17 |
| | | Max | 0.21 | 0.45 | 0.85 | 1.29 |
| Resistance Into Ground | Ω/kft | Min | 0.077 | 0.072 | 0.069 | 0.066 |
| | | In-range Example | 0.085 | 0.081 | 0.076 | 0.073 |
| | | Max | 0.094 | 0.089 | 0.084 | 0.081 |
| Break Load | lbs | Min | 4038 | 7886 | 13927 | 20770 |
| | | In-range Example | 4487 | 8762 | 15474 | 23077 |
| | | Max | 4936 | 9638 | 17022 | 25385 |

Table 3 below shows four other example ground conductors (Ex. A, Ex. B, Ex. C, and Ex. D) of this disclosure including minimum, maximum, and an in-range example of various ground conductor characteristics described throughout this disclosure. The four other example ground conductors of this disclosure (Ex. A, Ex. B, Ex. C, and Ex. D) can include aspects of the previously described ground conductor 500. For example, the four other example ground conductors of this disclosure (Ex. A, Ex. B, Ex. C, and Ex. D) can include the core in which the first material is steel, the sheath in which the second material is copper, a ground conductor thickness within or corresponding to the ground conductor thickness range, a sheath thickness within or corresponding to the sheath thickness range, and a ratio of the ground conductor width to the ground conductor thickness that is 11.1:1 or greater. The respective ranges of electro-thermal capacities of the four other example ground conductors of this disclosure (Ex. A, Ex. B, Ex. C, and Ex. D) can be advantageous because they correspond to existing electro-thermal capacities widely used for some ground conductors, particularly in markets outside the United States, which can improve market adoption of the ground conductors of this disclosure.

TABLE 3

| Characteristic | Unit | Value Type | Ex. A | Ex. B | Ex. C | Ex. D |
|---|---|---|---|---|---|---|
| Electro-Thermal Capacity | $I^2t$ | Min | 340 | 682 | 1074 | 1697 |
| | | In-range Example | 377 | 758 | 1193 | 1886 |
| | | Max | 415 | 834 | 1312 | 2075 |

TABLE 3-continued

| Characteristic | Unit | Value Type | Ex. A | Ex. B | Ex. C | Ex. D |
|---|---|---|---|---|---|---|
| Ground Conductor Thickness | in | Min | 0.070 | 0.070 | 0.070 | 0.070 |
| | | In-range Example | 0.083 | 0.083 | 0.083 | 0.083 |
| | | Max | 0.100 | 0.100 | 0.100 | 0.100 |
| Sheath Thickness | in | Min | 0.015 | 0.015 | 0.015 | 0.015 |
| | | In-range Example | 0.024 | 0.024 | 0.024 | 0.024 |
| | | Max | 0.030 | 0.030 | 0.030 | 0.030 |
| Ground Conductor Width | in | Min | 1.11 | 1.81 | 2.42 | 3.20 |
| | | In-range Example | 1.23 | 2.01 | 2.69 | 3.55 |
| | | Max | 1.35 | 2.22 | 2.96 | 3.91 |
| Ratio of Ground Conductor Width to Ground Conductor Thickness | n/a | Min | 11.1:1 | 18.1:1 | 24.2:1 | 32.0:1 |
| | | In-range Example | 14.8:1 | 24.3:1 | 32.4:1 | 42.8:1 |
| | | Max | 19.4:1 | 31.7:1 | 42.3:1 | 55.8:1 |
| Core Thickness | in | Min | 0.010 | 0.010 | 0.010 | 0.010 |
| | | In-range Example | 0.036 | 0.036 | 0.036 | 0.036 |
| | | Max | 0.070 | 0.070 | 0.070 | 0.070 |
| Core Width | in | Min | 1.05 | 1.75 | 2.36 | 3.14 |
| | | In-range Example | 1.18 | 1.97 | 2.64 | 3.50 |
| | | Max | 1.32 | 2.19 | 2.93 | 3.88 |
| Ratio of Core Width to Core Thickness | n/a | Min | 15.0:1 | 25.0:1 | 33.7:1 | 44.8:1 |
| | | In-range Example | 32.9:1 | 54.7:1 | 73.5:1 | 97.3:1 |
| | | Max | 132.5:1 | 218.6:1 | 293.1:1 | 387.5:1 |
| Linear Weight of Copper | lbs/ft | Min | 0.16 | 0.29 | 0.40 | 0.55 |
| | | In-range Example | 0.18 | 0.32 | 0.45 | 0.61 |
| | | Max | 0.20 | 0.36 | 0.49 | 0.67 |
| Resistance Into Ground | Ω/kft | Min | 0.077 | 0.074 | 0.072 | 0.070 |
| | | In-range Example | 0.086 | 0.082 | 0.080 | 0.078 |
| | | Max | 0.094 | 0.090 | 0.088 | 0.086 |
| Break Load | lbs | Min | 3885 | 6355 | 8489 | 11198 |
| | | In-range Example | 4317 | 7061 | 9433 | 12443 |
| | | Max | 4749 | 7768 | 10376 | 13687 |

Figure 7B:
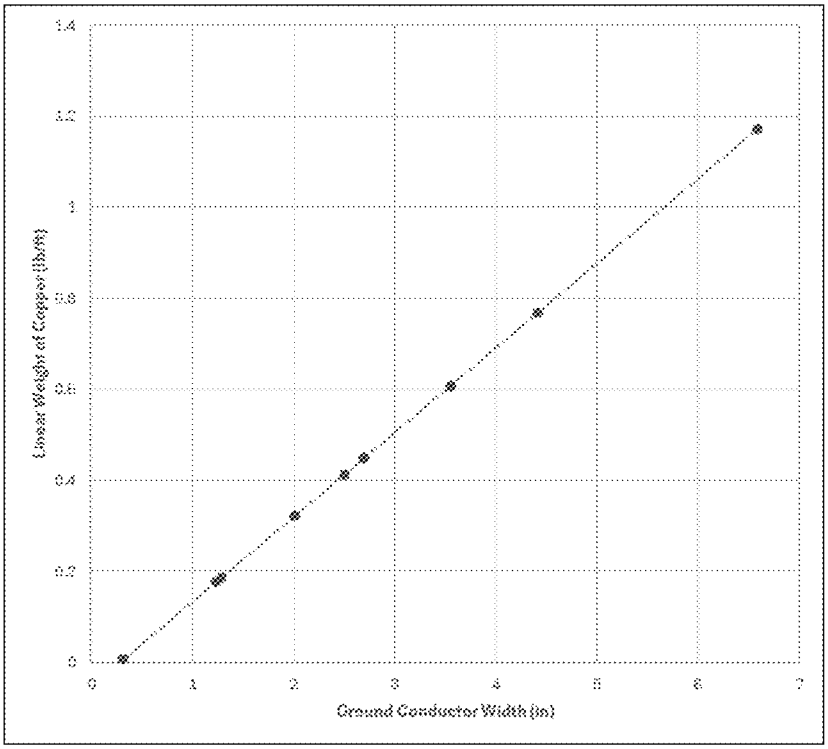
FIG. 7B shows a graph of the relationship between linear weight of copper and ground conductor width for ground conductors in accordance with aspects of this disclosure.

FIG. 7B shows a graph of the linear weight of copper of ground conductors of this disclosure as a function of the ground conductor width. The ground conductor data shown in FIG. 7B corresponds to the ground conductors of this disclosure (e.g., embodiments of the ground conductor 500) with the core in which the first material is steel, the sheath in which the second material is copper, a ground conductor thickness (e.g., 0.083 inches) within or corresponding to the ground conductor thickness range, and a sheath thickness (e.g., 0.024 inches) within or corresponding to the sheath thickness range. As shown in FIG. 7B, the linear weight of copper for example ground conductors of this disclosure can be a predictable function of the ground conductor width when the ground conductor thickness corresponds to the ground conductor thickness range and when the sheath thickness corresponds to the sheath thickness range.

Figure 7C:
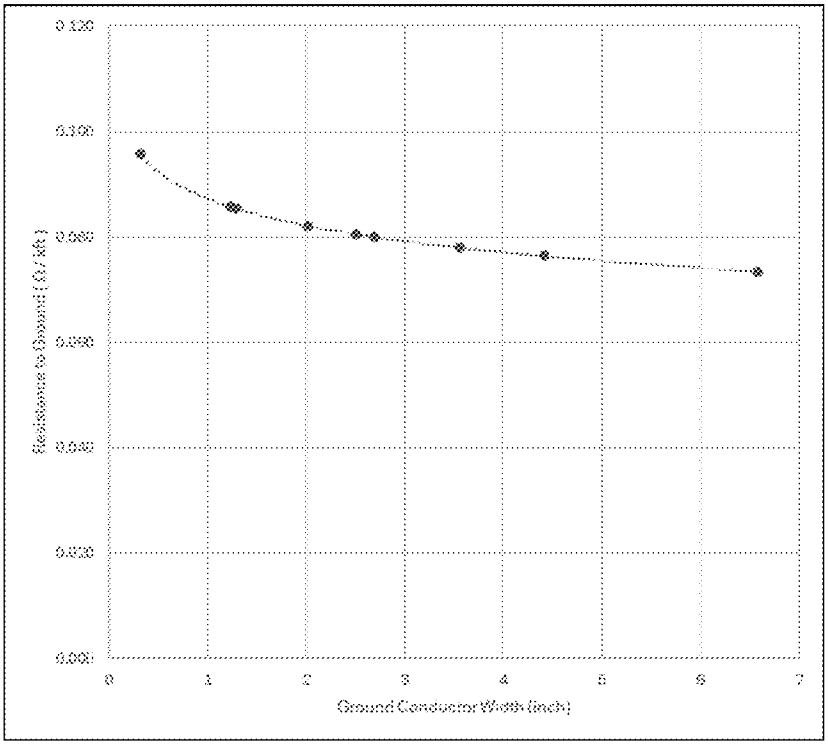
FIG. 7C shows a graph of the relationship between resistance to ground and ground conductor width for ground conductors in accordance with aspects of this disclosure.

FIG. 7C shows a graph of the resistance to ground of ground conductors of this disclosure as a function of the ground conductor width. The ground conductor data shown in FIG. 7C corresponds to the ground conductors of this disclosure (e.g., embodiments of the ground conductor 500) with the core in which the first material is steel, the sheath in which the second material is copper, a ground conductor thickness (e.g., 0.083 inches) within or corresponding to the ground conductor thickness range, and a sheath thickness (e.g., 0.024 inches) within or corresponding to the sheath thickness range. As shown in FIG. 7C, the resistance to ground for example ground conductors of this disclosure can be a predictable function of the ground conductor width when the ground conductor thickness corresponds to the ground conductor thickness range and when the sheath thickness corresponds to the sheath thickness range.

Figure 7D:
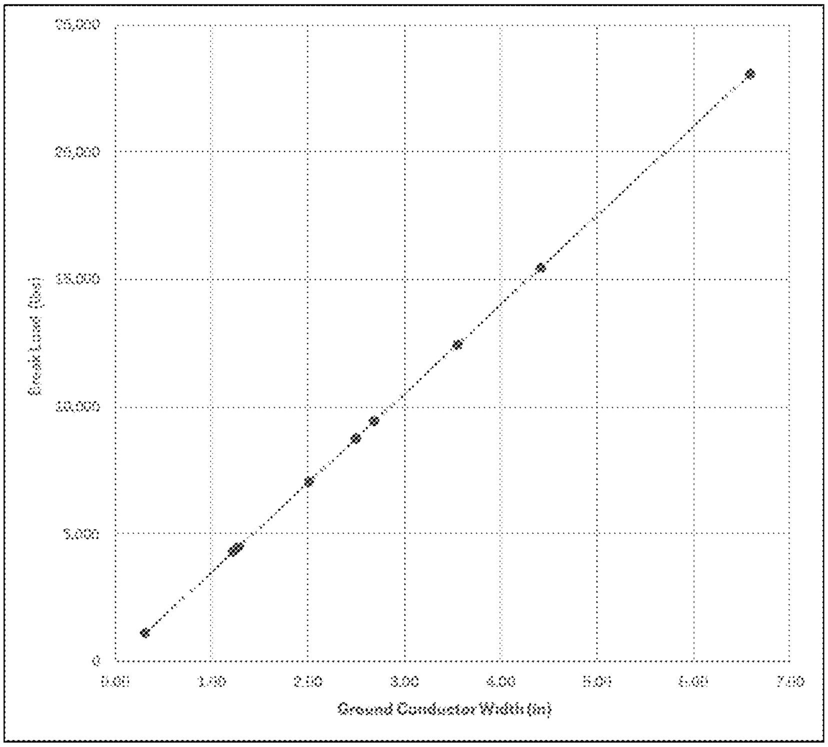
FIG. 7D shows a graph of the relationship between break load and ground conductor width for ground conductors in accordance with aspects of this disclosure.

FIG. 7D shows a graph of the break load of ground conductors of this disclosure as a function of the ground conductor width. The ground conductor data shown in FIG. 7D corresponds to the ground conductors of this disclosure (e.g., embodiments of the ground conductor 500) with the core in which the first material is steel, the sheath in which the second material is copper, a ground conductor thickness (e.g., 0.083 inches) within or corresponding to the ground conductor thickness range, and a sheath thickness (e.g., 0.024 inches) within or corresponding to the sheath thickness range. As shown in FIG. 7D, the break load for example ground conductors of this disclosure can be a predictable function of the ground conductor width when the ground conductor thickness corresponds to the ground conductor thickness range and when the sheath thickness corresponds to the sheath thickness range.

Aspects of this disclosure can be directed to any of the previously described grounding systems 100 employing any of the disclosed ground conductors (e.g., the ground conductors 500 and/or the ground conductors 600) as the ground conductor of the grounding system 100.

The following are some example embodiments of this invention; however, it is to be understood that the invention is not limited to any particular example embodiment described herein. A ground conductor of this disclosure according to example 1.00 of this invention comprises a core made of at least 95% steel by weight and a sheath surrounding the core. The sheath comprises at least one layer, and the at least one layer is made of a least 95% copper by weight. The ground conductor has a ground conductor width and a ground conductor thickness, and a ratio of the ground conductor width to the ground conductor thickness is at least 11.1:1.

A ground conductor of this disclosure according to example 1.01 of this invention comprises the ground conductor of example 1.00, wherein the ground conductor thickness is between 0.070 inches and 0.100 inches, inclusive.

A ground conductor of this disclosure according to example 1.02 of this invention comprises the ground conductor of example 1.00 or example 1.01, wherein the ground conductor comprises a first ground conductor side; a second ground conductor side; a third ground conductor side; and a fourth ground conductor side. Wherein the first ground conductor side opposes the third ground conductor side, the second ground conductor side opposes the fourth ground conductor side, the first ground conductor side is at least eleven times as long as each of the second ground conductor side and the fourth ground conductor side, and the ground conductor thickness is measured between opposing locations on the first ground conductor side and on the third ground conductor side.

A ground conductor of this disclosure according to example 1.03 of this invention comprises the ground conductor of any one of examples 1.00 through 1.02, wherein the ground conductor width is measured between opposing locations on the second ground conductor side and on the fourth ground conductor side.

A ground conductor of this disclosure according to example 1.04 of this invention comprises the ground conductor of any one of examples 1.00 through 1.03, wherein the at least one layer of the sheath has a sheath thickness between 0.015 inches and 0.030 inches, inclusive.

A ground conductor of this disclosure according to example 1.05 of this invention comprises the ground conductor of any one of examples 1.00 through 1.04, wherein the at least one layer of the sheath comprises an inner sheath surface and an outer sheath surface that opposes the inner sheath surface, the inner sheath surface faces the core, the outer sheath surface faces outwardly, and the sheath thickness is measured between opposing locations on the inner sheath surface and on the outer sheath surface.

A ground conductor of this disclosure according to example 1.06 of this invention comprises the ground conductor of any one of examples 1.00 through 1.05, wherein the core has a core width and a core thickness, and a ratio of the core width to the core thickness is greater than the ratio of the ground conductor width to the ground conductor thickness.

A ground conductor of this disclosure according to example 1.07 of this invention comprises the ground conductor of example 1.06, wherein the ratio of the core width to the core thickness is at least 15.0:1.

A ground conductor of this disclosure according to example 1.08 of this invention comprises the ground conductor of any one of examples 1.00 through 1.07, further comprising an interface region between the core and the at least one layer of the sheath, wherein the interface region comprises steel from the core and copper from the sheath that are diffusion-bonded together.

A ground conductor of this disclosure according to example 1.09 of this invention comprises the ground conductor of example 1.07, wherein at least a portion of the interface region has a thickness greater than 100 nm.

A ground conductor of this disclosure according to example 1.10 of this invention comprises the ground conductor of any one of examples 1.00 through 1.09, wherein the ground conductor has a ground conductor length extending along a longitudinal axis of the ground conductor, the ground conductor length is greater than the ground conductor width, the core comprises a plurality of sides that extend longitudinally along the longitudinal axis, and the sheath surrounds the core continuously and circumferentially around the longitudinal axis such that the sheath encapsulates each of the plurality of sides of the core.

A ground conductor of this disclosure according to example 1.11 of this invention comprises the ground conductor of any one of examples 1.00 through 1.10, wherein the core is integral and the sheath is integral.

A ground conductor of this disclosure according to example 1.12 of this invention comprises the ground conductor of any one of examples 1.00 through 1.11, wherein the ground conductor comprises only one strand.

A ground conductor of this disclosure according to example 1.13 of this invention comprises the ground conductor of any one of examples 1.00 through 1.12, wherein the sheath comprises only one layer and the at least one layer is the only one layer.

A ground conductor of this disclosure according to example 1.14 of this invention comprises the ground conductor of any one of examples 1.00 through 1.12, wherein the sheath comprises a plurality of layers and the at least one layer is a first layer of the plurality of layers.

A ground conductor of this disclosure according to example 1.15 of this invention comprises the ground conductor of any one of examples 1.00 through 1.14, wherein: the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 11.5:1 and 20.1:1, inclusive, and the ground conductor has an electrothermal capacity of between 357 $I^2t$ and 436 $I^2t$, inclusive.

A ground conductor of this disclosure according to example 1.16 of this invention comprises the ground conductor of example 1.15, wherein the copper of the sheath has a linear weight of between 0.17 lbs/ft and 0.21 lbs/ft, inclusive.

A ground conductor of this disclosure according to example 1.17 of this invention comprises the ground conductor of example 1.15 or example 1.16, wherein the ground conductor has a resistance to ground of between 0.077 Ω/kft and 0.094 Ω/kft, inclusive.

A ground conductor of this disclosure according to example 1.18 of this invention comprises the ground conductor of any one of examples 1.15 through 1.17, wherein the ground conductor has a break load of between 4038 lbs and 4936 lbs, inclusive.

A ground conductor of this disclosure according to example 1.19 of this invention comprises the ground conductor of any one of examples 1.15 through 1.18, wherein the core has a core width and a core thickness, and a ratio of the core width to the core thickness is between 15.6:1 and 137.8:1, inclusive.

A ground conductor of this disclosure according to example 1.20 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 22.5:1 and 39.3:1, inclusive, and the ground conductor has an electrothermal capacity of between 955 $I^2t$ and 1167 $I^2t$, inclusive.

A ground conductor of this disclosure according to example 1.21 of this invention comprises the ground conductor of example 1.20, wherein the copper of the sheath has a linear weight of between 0.37 lbs/ft and 0.45 lbs/ft, inclusive.

A ground conductor of this disclosure according to example 1.22 of this invention comprises the ground conductor of example 1.20 or example 1.21, wherein the ground conductor has a resistance to ground of between 0.072 Ω/kft and 0.089 Ω/kft, inclusive.

A ground conductor of this disclosure according to example 1.23 of this invention comprises the ground conductor of any one of examples 1.20 through 1.22, wherein the ground conductor has a break load of between 7886 lbs and 9638 lbs, inclusive.

A ground conductor of this disclosure according to example 1.24 of this invention comprises the ground conductor of any one of examples 1.20 through 1.23, wherein the core has a core width and a core thickness, and a ratio of the core width to the core thickness is between 31.3:1 and 272.0:1, inclusive.

A ground conductor of this disclosure according to example 1.25 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 39.7:1 and 69.4:1, inclusive, and the ground conductor has an electrothermal capacity of between 2470 $I^2t$ and 3018 $I^2t$, inclusive.

A ground conductor of this disclosure according to example 1.26 of this invention comprises the ground conductor of example 1.25, wherein the copper of the sheath has a linear weight of between 0.69 lbs/ft and 0.85 lbs/ft, inclusive.

A ground conductor of this disclosure according to example 1.27 of this invention comprises the ground conductor of example 1.25 or example. 1.26, wherein, the ground conductor has a resistance to ground of between 0.069 Ω/kft and 0.084 Ω/kft, inclusive.

A ground conductor of this disclosure according to example 1.28 of this invention comprises the ground conductor of any one of examples 1.25 through 1.27, wherein the ground conductor has a break load of between 13927 lbs and 17022 lbs, inclusive.

A ground conductor of this disclosure according to example 1.29 of this invention comprises the ground conductor of any one of examples 1.25 through 1.28, wherein the core has a core width and a core thickness, and a ratio of the core width to the core thickness is between 55.9:1 and 482.7:1, inclusive.

A ground conductor of this disclosure according to example 1.30 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 59.3:1 and 103.5:1, inclusive, and the ground conductor has an electrothermal capacity of between 5041 $I^2t$ and 6161 $I^2t$, inclusive.

A ground conductor of this disclosure according to example 1.31 of this invention comprises the ground conductor of example 1.30, wherein the copper of the sheath has a linear weight of between 1.05 lbs/ft and 1.29 lbs/ft, inclusive.

A ground conductor of this disclosure according to example 1.32 of this invention comprises the ground conductor of example 1.30 or example 1.31, wherein the ground conductor has a resistance to ground of between 0.066 Ω/kft and 0.081 Ω/kft, inclusive.

A ground conductor of this disclosure according to example 1.33 of this invention comprises the ground conductor of any one of examples 1.30 through 1.32, wherein the ground conductor has a break load of between 20770 lbs and 25385 lbs, inclusive.

A ground conductor of this disclosure according to example 1.34 of this invention comprises the ground conductor of any one of examples 1.30 through 1.33, wherein the core has a core width and a core thickness, and a ratio of the core width to the core thickness is between 83.8:1 and 721.3:1, inclusive.

A ground conductor of this disclosure according to example 1.35 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 11.1:1 and 19.4:1, inclusive, and the ground conductor has an electrothermal capacity of between 340 $I^2t$ and 415 $I^2t$, inclusive.

A ground conductor of this disclosure according to example 1.36 of this invention comprises the ground conductor of example 1.35, wherein the copper of the sheath has a linear weight of between 0.16 lbs/ft and 0.20 lbs/ft, inclusive.

A ground conductor of this disclosure according to example 1.37 of this invention comprises the ground conductor of example 1.35 or example 1.36, wherein the ground conductor has a resistance to ground of between 0.077 Ω/kft and 0.094 Ω/kft, inclusive.

A ground conductor of this disclosure according to example 1.38 of this invention comprises the ground conductor of any one of examples 1.35 through 1.37, wherein the ground conductor has a break load of between 3885 lbs and 4749 lbs, inclusive.

A ground conductor of this disclosure according to example 1.39 of this invention comprises the ground conductor of any one of examples 1.35 through 1.38, wherein the core has a core width and a core thickness, and a ratio of the core width to the core thickness is between 15.0:1 and 132.5:1, inclusive.

A ground conductor of this disclosure according to example 1.40 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 18.1:1 and 31.7:1, inclusive, and the ground conductor has an electrothermal capacity of between 682 $I^2t$ and 834 $I^2t$, inclusive.

A ground conductor of this disclosure according to example 1.41 of this invention comprises the ground conductor of example 1.40, wherein the copper of the sheath has a linear weight of between 0.29 lbs/ft and 0.36 lbs/ft, inclusive.

A ground conductor of this disclosure according to example 1.42 of this invention comprises the ground conductor of example 1.40 or example 1.41, wherein the ground conductor has a resistance to ground of between 0.074 Ω/kft and 0.090 Ω/kft, inclusive.

A ground conductor of this disclosure according to example 1.43 of this invention comprises the ground conductor of any one of examples 1.40 through 1.42, wherein the ground conductor has a break load of between 6355 lbs and 7768 lbs, inclusive.

A ground conductor of this disclosure according to example 1.44 of this invention comprises the ground conductor of any one of examples 1.40 through 1.43, wherein the core has a core width and a core thickness, and a ratio of the core width to the core thickness is between 25.0:1 and 218.6:1, inclusive.

A ground conductor of this disclosure according to example 1.45 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 24.2:1 and 42.3:1, inclusive, and the ground conductor has an electrothermal capacity of between 1074 $I^2t$ and 1312 $I^2t$, inclusive.

A ground conductor of this disclosure according to example 1.46 of this invention comprises the ground conductor of example 1.45, wherein the copper of the sheath has a linear weight of between 0.40 lbs/ft and 0.49 lbs/ft, inclusive.

A ground conductor of this disclosure according to example 1.47 of this invention comprises the ground conductor of example 1.45 or example 1.46, wherein the ground conductor has a resistance to ground of between 0.072 Ω/kft and 0.088 Ω/kft, inclusive.

A ground conductor of this disclosure according to example 1.48 of this invention comprises the ground conductor of any one of examples 1.45 through 1.47, wherein the ground conductor has a break load of between 8489 lbs and 10376 lbs, inclusive.

A ground conductor of this disclosure according to example 1.49 of this invention comprises the ground conductor of any one of examples 1.45 through 1.48, wherein the core has a core width and a core thickness, and a ratio of the core width to the core thickness is between 33.7:1 and 293.1:1, inclusive.

A ground conductor of this disclosure according to example 1.50 of this invention comprises the ground conductor of any one of examples 1.00 through 1.14, wherein the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thick ness is between 32.0:1 and 55.8:1, inclusive, and the ground conductor has an electrothermal capacity of between 1697 $I^2t$ and 2075 $I^2t$, inclusive.

A ground conductor of this disclosure according to example 1.51 of this invention comprises the ground conductor of example 1.50, wherein the copper of the sheath has a linear weight of between 0.55 lbs/ft and 0.67 lbs/ft, inclusive.

A ground conductor of this disclosure according to example 1.52 of this invention comprises the ground conductor of example 1.50 or example. 1.51, wherein the ground conductor has a resistance to ground of between 0.070 Ω/kft and 0.086 Ω/kft, inclusive.

A ground conductor of this disclosure according to example 1.53 of this invention comprises the ground conductor of any one of examples 1.50 through 1.52, wherein the ground conductor has a break load of between 11198 lbs and 13687 lbs, inclusive.

A ground conductor of this disclosure according to example 1.54 of this invention comprises the ground conductor of any one of examples 1.50 through 1.53, wherein the core has a core width and a core thickness, and a ratio of the core width to the core thickness is between 44.8:1 and 387.5:1, inclusive.

A ground conductor of this disclosure according to example 2.00 of this invention comprises a core made of at least a first material and a sheath surrounding the core. The sheath comprises at least one layer, and the at least one layer is made of a least a second material that is different from the first material. The second material has an electrical conductivity greater than an electrical conductivity of the first material. The ground conductor has a ground conductor width and a ground conductor thickness, a ratio of the ground conductor width to the ground conductor thickness is at least 11.1:1, and the ground conductor has an electrothermal capacity of at least 340 $I^2t$.

A ground conductor of this disclosure according to example 2.01 of this invention comprises the ground conductor of example 2.00, wherein the core has a core width and a core thickness, and a ratio of the core width to the core thickness is greater than the ratio of the ground conductor width to the ground conductor thickness.

A ground conductor of this disclosure according to example 2.02 of this invention comprises the ground conductor of example 2.01, wherein the ratio of the core width to the core thickness is at least 15.0:1.

A ground conductor of this disclosure according to example 2.03 of this invention comprises the ground conductor of any one of examples 2.00 through 2.02, wherein the first material is at least 95% of the core by weight, and the second material is at least 95% of the at least one layer of the sheath by weight.

A ground conductor of this disclosure according to example 2.04 of this invention comprises the ground conductor of any one of examples 2.00 through 2.03, wherein the first material comprises at least one of steel, steel alloy, nickel-iron alloy, brass, and aluminum; and the second material comprises at least one of copper, copper alloy, nickel, nickel alloy, steel, polymer, and graphene.

A ground conductor of this disclosure according to example 2.05 of this invention comprises the ground conductor of any one of examples 2.00 through 2.04, wherein the first material comprises steel and the steel is at least 95% of the first material by weight, and the second material comprises copper and the copper is at least 95% of the second material by weight.

A ground conductor of this disclosure according to example 2.06 of this invention comprises the ground conductor of any one of examples 2.00 through 2.05, wherein the first material comprises steel and the steel is at least 95% of the core by weight, and the second material comprises copper and the copper is at least 95% of the sheath by weight.

A ground conductor of this disclosure according to example 2.07 of this invention comprises the ground conductor of any one of examples 2.00 through 2.06, wherein the ground conductor thickness is between 0.070 inches and 0.100 inches, inclusive.

A ground conductor of this disclosure according to example 2.08 of this invention comprises the ground conductor of any one of examples 2.00 through 2.07, wherein the ground conductor comprises: a first ground conductor side; a second ground conductor side; a third ground conductor side; and a fourth ground conductor side, wherein the first ground conductor side opposes the third ground conductor side, the second ground conductor side opposes the fourth ground conductor side, the first ground conductor side is at least eleven times as long as each of the second ground conductor side and the fourth ground conductor side, and the ground conductor thickness is measured between opposing locations on the first ground conductor side and on the third ground conductor side.

A ground conductor of this disclosure according to example 2.09 of this invention comprises the ground conductor of any one of examples 2.00 through 2.08, wherein the ground conductor width is measured between opposing locations on the second ground conductor side and on the fourth ground conductor side.

A ground conductor of this disclosure according to example 2.10 of this invention comprises the ground conductor of any one of examples 2.00 through 2.09, wherein the sheath has a sheath thickness between 0.015 inches and 0.030 inches, inclusive.

A ground conductor of this disclosure according to example 2.11 of this invention comprises the ground conductor of any one of examples 2.00 through 2.10, wherein the sheath comprises an inner sheath surface and an outer sheath surface that opposes the inner sheath surface, the inner sheath surface faces the core, the outer sheath surface faces outwardly, and the sheath thickness is measured between opposing locations on the inner sheath surface and on the outer sheath surface.

A ground conductor of this disclosure according to example 2.12 of this invention comprises the ground conductor of any one of examples 2.00 through 2.11, further comprising an interface region between the core and the sheath, wherein the interface region comprises a portion of the core and a portion of the sheath that are diffusion-bonded together.

A ground conductor of this disclosure according to example 2.13 of this invention comprises the ground conductor of example 2.12, wherein at least a portion of the interface region has a thickness greater than 100 nm.

A ground conductor of this disclosure according to example 2.14 of this invention comprises the ground conductor of any one of examples 2.00 through 2.13, wherein the ground conductor has a ground conductor length extending along a longitudinal axis of the ground conductor, the ground conductor length is greater than the ground conductor width, the core comprises a plurality of sides that extend longitudinally along the longitudinal axis, and the sheath surrounds the core continuously and circumferentially around the longitudinal axis such that the sheath encapsulates each of the plurality of sides of the core.

A ground conductor of this disclosure according to example 2.15 of this invention comprises the ground conductor of any one of examples 2.00 through 2.14, wherein the core is integral and the sheath is integral.

A ground conductor of this disclosure according to example 2.16 of this invention comprises the ground conductor of any one of examples 2.00 through 2.15, wherein the ground conductor comprises only one strand.

A ground conductor of this disclosure according to example 2.17 of this invention comprises the ground conductor of any one of examples 2.00 through 2.16, wherein the sheath comprises only one layer and the at least one layer is the only one layer.

A ground conductor of this disclosure according to example 2.18 of this invention comprises the ground conductor of any one of examples 2.00 through 2.16, wherein the sheath comprises a plurality of layers and the at least one layer is a first layer of the plurality of layers.

It will be appreciated that the foregoing description provides examples of the invention. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

What is claimed is:

1. A ground conductor comprising:
- a core made of at least 95% steel by weight; and
- a sheath surrounding the core, the sheath comprising at least one layer, the at least one layer being made of a least 95% copper by weight, wherein:
- the ground conductor has a ground conductor width and a ground conductor thickness, and
- a ratio of the ground conductor width to the ground conductor thickness is at least 11.1:1.

2. The ground conductor of claim 1, wherein:
- the ground conductor thickness is between 0.070 inches and 0.100 inches, inclusive, and
- wherein the at least one layer of the sheath has a sheath thickness between 0.015 inches and 0.030 inches, inclusive.

3. The ground conductor of claim 2, wherein:
- the ground conductor comprises:
  - a first ground conductor side that extends longitudinally along a longitudinal axis of the ground conductor;
  - a second ground conductor side that extends longitudinally along the longitudinal axis;
  - a third ground conductor side that extends longitudinally along the longitudinal axis; and
  - a fourth ground conductor side that extends longitudinally along the longitudinal axis, wherein:
- the first ground conductor side opposes the third ground conductor side,
- the second ground conductor side opposes the fourth ground conductor side,
- the first ground conductor side is at least eleven times as long as each of the second ground conductor side and the fourth ground conductor side,
- the ground conductor thickness is measured between opposing locations on the first ground conductor side and on the third ground conductor side,
- the ground conductor width is measured between opposing locations on the second ground conductor side and on the fourth ground conductor side, and
- the sheath surrounds the core continuously and circumferentially around the longitudinal axis such that the sheath encapsulates each of the first ground conductor side, the second ground conductor side, the third ground conductor side, and the fourth ground conductor side.

4. The ground conductor of claim 3, wherein:
- the at least one layer of the sheath comprises an inner sheath surface and an outer sheath surface that opposes the inner sheath surface,
- the inner sheath surface faces the core,
- the outer sheath surface faces outwardly, and
- the sheath thickness is measured between opposing locations on the inner sheath surface and on the outer sheath surface.

5. The ground conductor of claim 1, wherein:
- the core has a core width and a core thickness, and
- a ratio of the core width to the core thickness is greater than the ratio of the ground conductor width to the ground conductor thickness.

6. The ground conductor of claim 5, wherein the ratio of the core width to the core thickness is at least 15.0:1.

7. The ground conductor of claim 1, further comprising an interface region between the core and the at least one layer of the sheath, wherein the interface region comprises steel from the core and copper from the sheath that are diffusion-bonded together.

8. The ground conductor of claim 7, wherein at least a portion of the interface region has a thickness greater than 100 nm.

9. The ground conductor of claim 1, wherein the ground conductor comprises only one strand.

10. The ground conductor of claim 1, wherein the sheath comprises only one layer and the at least one layer is the only one layer.

11. The ground conductor of claim 1, wherein:
- the ground conductor thickness is between 0.070 inches and 0.100 inches, inclusive,
- the at least one layer of the sheath has a sheath thickness between 0.015 inches and 0.030 inches, inclusive,
- the ratio of the ground conductor width to the ground conductor thickness is between 11.5:1 and 20.1:1, inclusive, and the ground conductor has an electro-thermal capacity of between 357 $I^2t$ and 436 $I^2t$, inclusive.

12. The ground conductor of claim 11, wherein the copper of the sheath has a linear weight of between 0.17 lbs/ft and 0.21 lbs/ft, inclusive.

13. The ground conductor of claim 11, wherein the ground conductor has a resistance to ground of between 0.077 Ω/kft and 0.094 Ω/kft, inclusive.

14. The ground conductor of claim 11, wherein the ground conductor has a break load of between 4038 lbs and 4936 lbs, inclusive.

15. The ground conductor of claim 11, wherein:

the core has a core width and a core thickness, and a ratio of the core width to the core thickness is between 15.6:1 and 137.8:1, inclusive.

16. The ground conductor of claim 1, wherein:

the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 22.5:1 and 39.3:1, inclusive, and the ground conductor has an electro-thermal capacity of between 955 $I^2t$ and 1167 $I^2t$, inclusive.

17. The ground conductor of claim 16, wherein the copper of the sheath has a linear weight of between 0.37 lbs/ft and 0.45 lbs/ft, inclusive.

18. The ground conductor of claim 16, wherein the ground conductor has a resistance to ground of between 0.072 Ω/kft and 0.089 Ω/kft, inclusive.

19. The ground conductor of claim 16, wherein the ground conductor has a break load of between 7886 lbs and 9638 lbs, inclusive.

20. The ground conductor of claim 16, wherein:

the core has a core width and a core thickness, and a ratio of the core width to the core thickness is between 31.3:1 and 272.0:1, inclusive.

21. The ground conductor of claim 1, wherein:

the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 39.7:1 and 69.4:1, inclusive, and the ground conductor has an electro-thermal capacity of between 2470 $I^2t$ and 3018 $I^2t$, inclusive.

22. The ground conductor of claim 21, wherein the copper of the sheath has a linear weight of between 0.69 lbs/ft and 0.85 lbs/ft, inclusive.

23. The ground conductor of claim 21, wherein the ground conductor has a resistance to ground of between 0.069 Ω/kft and 0.084 Ω/kft, inclusive.

24. The ground conductor of claim 21, wherein the ground conductor has a break load of between 13927 lbs and 17022 lbs, inclusive.

25. The ground conductor of claim 21, wherein:

the core has a core width and a core thickness, and a ratio of the core width to the core thickness is between 55.9:1 and 482.7:1, inclusive.

26. The ground conductor of claim 1, wherein:

the ground conductor thickness is between 0.070 inches and 0.100 inches, inclusive, the at least one layer of the sheath has a sheath thickness between 0.015 inches and 0.030 inches, inclusive, the ratio of the ground conductor width to the ground conductor thickness is between 59.3:1 and 103.5:1, inclusive, and the ground conductor has an electro-thermal capacity of between 5041 $I^2t$ and 6161 $I^2t$, inclusive.

27. The ground conductor of claim 26, wherein the copper of the sheath has a linear weight of between 1.05 lbs/ft and 1.29 lbs/ft, inclusive.

28. The ground conductor of claim 26, wherein the ground conductor has a resistance to ground of between 0.066 Ω/kft and 0.081 Ω/kft, inclusive.

29. The ground conductor of claim 26, wherein the ground conductor has a break load of between 20770 lbs and 25385 lbs, inclusive.

30. The ground conductor of claim 26, wherein:

the core has a core width and a core thickness, and a ratio of the core width to the core thickness is between 83.8:1 and 721.3:1, inclusive.

* * * * *